US012341796B2

(12) United States Patent
Techentin et al.

(10) Patent No.: US 12,341,796 B2
(45) Date of Patent: Jun. 24, 2025

(54) SYSTEMS, METHODS, AND MEDIA FOR DISTRIBUTED NETWORK MONITORING USING LOCAL MONITORING DEVICES

(71) Applicant: Mayo Foundation for Medical Education and Research, Rochester, MN (US)

(72) Inventors: Robert W. Techentin, Rochester, MN (US); David R. Holmes, III, Rochester, MN (US); Barry K. Gilbert, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 200 days.

(21) Appl. No.: 18/040,694

(22) PCT Filed: Aug. 6, 2021

(86) PCT No.: PCT/US2021/044892
§ 371 (c)(1),
(2) Date: Feb. 6, 2023

(87) PCT Pub. No.: WO2022/032065
PCT Pub. Date: Feb. 10, 2022

(65) Prior Publication Data
US 2023/0283621 A1    Sep. 7, 2023

Related U.S. Application Data

(60) Provisional application No. 63/062,216, filed on Aug. 6, 2020.

(51) Int. Cl.
*G06F 21/55*    (2013.01)
*H04L 9/40*    (2022.01)

(52) U.S. Cl.
CPC ...... *H04L 63/1425* (2013.01); *H04L 63/0236* (2013.01); *H04L 63/1441* (2013.01)

(58) Field of Classification Search
None
See application file for complete search history.

(56) References Cited

U.S. PATENT DOCUMENTS 9,438,614 B2    9/2016 Herz
10,122,740 B1 *  11/2018 Finkelshtein ....... H04L 63/1441
(Continued)

OTHER PUBLICATIONS

Albers, P. et al., Security in Ad Hoc Networks: A General Intrusion Detection Architecture Enhancing Trust Based Approaches, In Wireless Information Systems, 2002, pp. 1-12.
(Continued)

*Primary Examiner* — Christopher B Robinson
(74) *Attorney, Agent, or Firm* — Quarles & Brady LLP

(57) ABSTRACT

In accordance with some embodiments of the disclosed subject matter, mechanisms for distributed network monitoring are provided. In some embodiments, a system for distributed network monitoring comprises: local monitors, each comprising: a processor programmed to: generate a model of normal network traffic between a computing device and a router; receive additional traffic; calculate a metric based on a metadata parameter of the additional traffic; determine, based on the metric, whether the additional traffic is anomalous; and transmit, to a central monitoring system, information indicating that the additional traffic is anomalous; and the central monitoring system comprising: a second processor programmed to: receive information indicating that the additional traffic is anomalous; receive information related to the additional traffic; determine, based on the information, that the additional traffic is anomalous; and take an action to secure commu-
(Continued)

nications across the portion of the network associated with the additional traffic.

20 Claims, 11 Drawing Sheets

(56) References Cited

U.S. PATENT DOCUMENTS

| | | | | |
|---|---|---|---|---|
| 2009/0245109 | A1* | 10/2009 | Hurley | H04L 41/142 370/235 |
| 2010/0030544 | A1* | 2/2010 | Gopalan | H04L 41/142 703/13 |
| 2010/0031156 | A1* | 2/2010 | Doyle | H04L 41/147 715/736 |
| 2010/0138919 | A1* | 6/2010 | Peng | H04L 61/00 709/224 |
| 2011/0090797 | A1* | 4/2011 | Beecroft | H04L 45/125 370/237 |
| 2016/0352766 | A1* | 12/2016 | Flacher | H04L 12/28 |
| 2017/0013001 | A1* | 1/2017 | Friedman | H04L 63/20 |
| 2017/0279698 | A1 | 9/2017 | Sartran et al. | |
| 2017/0279827 | A1 | 9/2017 | Savalle et al. | |
| 2018/0337836 | A1* | 11/2018 | Balabine | H04L 63/1425 |

OTHER PUBLICATIONS

Amigo, J. et al., A Brief Review of Generalized Entropies, Entropy, 2018, 20(11): 813, 21 pages.

Arackaparambil, C. et al., Distributed Monitoring of Conditional Entropy for Anomaly Detection in Streams, In 2010 IEEE International Symposium on Parallel & Distributed Processing, Workshops and Phd Forum (IPDPSW), 2010, pp. 1-8.

Berezinski, P. et al., An Entropy-Based Network Anomaly Detection Method, Entropy, 2015, 17:2367-2408.

D'Otreppe, T., OpenWIPS-ng, A Modular and Open Source WIPS, Sharkfest '12 Wireshark Developer and User Conference, 2012, 36 pages.

Dlugosch, P. et al., An Efficient and Scalable Semiconductor Architecture for Parallel Automata Processing, IEEE Transactions on Parallel and Distributed Systems, 2014, 25(12): 3088-3098.

Duessel, P. et al., Detecting Zero-Day Attacks Using Context-Aware Anomaly Detection at the Application-Layer, International Journal of Information Security, 2017, 16(5):475-490.

Ghosh, A. et al., Agent-Based Distributed Intrusion Alert System, In International Workshop on Distributed Computing, 2004, pp. 240-251.

Gu, Y. et al., Detecting Anomalies in Network Traffic Using Maximum Entropy Estimation, In Proceedings of the 5th ACM SIGCOMM Conference on Internet Measurement, 2005, pp. 345-350.

Kachirski, O. et al., Intrusion Detection Using Mobile Agents in Wireless Ad Hoc Networks, Proceedings of the IEEE Workshop on Knowledge Media Networking, 2002, pp. 1-6.

Klein, E., Top 5 Open-Source NIDS Solutions, Apr. 11, 2019, 13 pages.

Lasheng, Y. et al., Agent Based Distributed Intrusion Detection System (ABDIDS), Proceedings of the Second Symposium International Computer Science and Computational Technology (ISCSCT'09), 2009, pp. 134-138.

Netbeez, Inc., NetBeez: Technology Overview and Benefits, 2015, 3 pages.

Nychis, G. et al., An Empirical Evaluation of Entropy-Based Traffic Anomaly Detection, In Proceedings of the 8th ACM SIGCOMM Conference on Internet Measurement, 2008, pp. 151-156.

Porras, P. et al., EMERALD: Event Monitoring Enabling Responses to Anomalous Live Disturbances, In Proceedings of the 20th National Information Systems Security Conference, 1997, 3:353-365.

Shannon, C., A Mathematical Theory of Communication, The Bell System Technical Journal, 1948, 27(3):379-423, 623-656.

Sommer, R. et al., Outside the Closed World: On Using Machine Learning for Network Intrusion Detection, 2010 IEEE Symposium on Security and Privacy, 2010, pp. 305-316.

Tellenbach, B. et al., Accurate Network Anomaly Classification with Generalized Entropy Metrics, Computer Networks, 2011, 55:3485-3502.

Wadden, J. et al., ANMLZoo: A Benchmark Suite for Exploring Bottlenecks in Automata Processing Engines and Architectures, In 2016 IEEE International Symposium on Workload Characterization (IISWC), 2016, pp. 1-12.

Zhang, Y. et al., Intrusion Detection Techniques for Mobile Wireless Networks, Mobile Networks and Applications, 2003, pp. 1-16.

Zhao, X. et al., A Parallel Scheme for IDS, Proceedings of the Second International Conference on Machine Learning and Cybernetics, 2003, pp. 2379-2383.

PCT International Search Report and Written Opinion, PCT/US2021/044892, Oct. 25, 2021, 12 pages.

* cited by examiner

SYSTEMS, METHODS, AND MEDIA FOR DISTRIBUTED NETWORK MONITORING USING LOCAL MONITORING DEVICES

CROSS-REFERENCE TO RELATED APPLICATIONS

This application represents the national stage entry of PCT/US2021/044892 filed on Aug. 6, 2021 and claims priority to, U.S. Provisional Application No. 63/062,216, filed Aug. 6, 2020, which is hereby incorporated herein by reference in its entirety for all purposes.

STATEMENT REGARDING FEDERALLY SPONSORED RESEARCH

N/A

BACKGROUND

Monitoring a modern, large-scale network (e.g., a corporate network, a government network, or a university network) is challenging for several reasons. First and foremost, the network is large and complex. For example, at Mayo Clinic, the intranet spans more than three hundred buildings in seven states and supports more than sixty thousand employees. There are more than a quarter of a million networked systems, transmitting and receiving billions of flows and more than 90 TB of data per hour, circa 2021 and doubling every year. The number of unique agent behaviors (e.g., user, system, and/or software) was not explicitly calculated, but likely is in the tens of thousands.

Additionally, it is difficult to collect data for such a network into a centralized location for analysis. The challenges arise from two different aspects of the data needed for network defense. First, there is a huge diversity in the data needed by network operations centers to research and understand threat reports. These types of data can include authentication logs, reports from workstation virus scans, threat intelligence reports, and alerts from the network firewall and/or intrusion prevention system (IPS). Second, even more challenging than diversity of sources, is the huge quantity of network information. Recording all network data is impractical, but it is common to attempt to collect and analyze network traffic "metadata." Metadata is used to succinctly characterize data transmissions on the network, usually in terms of time sample collected source and destination, protocol, and traffic quantities. Just the metadata summaries of a large network can reach billions of records per day. Network forensics requires a significant event history, as intrusions are often not discovered for weeks or even months. Analysis tools designed to confirm threat reports or hunt for intruders often do not scale up to the sizes and complexities of larger networks. Because of the huge amount of network metadata, some systems sample (e.g., 10%) the traffic metadata. While the small sample size can be helpful for network capacity planning, it greatly diminishes the ability to detect threats.

Visibility into the network is also often limited by the monitoring systems themselves. There are many commercial and open source intrusion detection and prevention systems, firewalls, web and email filters, and other network monitoring appliances which, when deployed in a large corporate network, operate in a distributed fashion, where each system has responsibility for monitoring some aspect of network traffic. There are also network "probes," which can scan network traffic metadata and contents for malware or specific patterns of threat behaviors. However, each monitoring system views only part of the network. A web filter system, for example, placed between the corporate network and the Internet could attempt to identify malware in downloaded files or patterns of malware insertion, activation, and/or operation. But that system would not necessarily capture malware or patterns of malware insertion, activation, and/or operation moving between internal web servers and clients.

Network monitoring and security event management are also often plagued with high false positive rates for security events. Operators of networks of consequential size have generally implemented a security operations center (SOC), at the heart of which is a Security Information Event Management (SIEM) system. Security analysis systems automatically collect data and alerts into centralized repositories, and the SIEM attempts to assist in analyzing the events, triaging and prioritizing those that the security team can address. In a single organization, the network may include multiple SOCs and SIEMs that may operate independently or may operate in a coordinated manner (e.g., based on a hierarchy).

In general, network security analysis capability depends upon the data that can be obtained from the network, and the availability of that data depends on the available sensors. Mature security operations collect event data from centralized services, such as active directory authentication server and domain-name service (DNS) servers. Many also collect some form of metadata, often provided by network infrastructure. Network operators can also install "probes" into the network, which perform sophisticated traffic analysis and report unusual or threatening behaviors to the centralized operations systems. However, these probes are relatively expensive and deployed only at key network locations. Note that network-based intrusion detection systems are sometimes referred to as NIDS. Such systems are often deployed alongside host-based intrusion detection systems (HIDS) that collect information about incoming and outgoing traffic from the internet. Open source probes, such as "Zeek" (formerly referred to as "BBros") are often deployed on a high performance server and cost at least several thousand dollars; commercial probes can easily cost more than $50,000 depending on capability.

Accordingly, new systems, methods, and media for distributed network monitoring using local monitoring devices are desirable.

SUMMARY

In accordance with some embodiments of the disclosed subject matter, systems, methods, and media for distributed network monitoring using local monitoring devices are provided.

In accordance with some embodiments of the disclosed subject matter, a system for distributed network monitoring is provided, comprising: a plurality of local monitoring devices, each of the plurality of local monitoring devices disposed between at least one computing device and a networking router, each particular local monitoring device of the plurality of devices comprising: at least one processor that is programmed to: receive, over a first period of time, network traffic between the at least one computing device and the networking router associated with the particular local monitoring device; generate a model of normal network traffic over the first period of time based on the network traffic between the at least one computing device and the networking router associated with the particular local monitoring device; receive, over a second period of time subsequent to the first period of time, network traffic between the at least one computing device and the networking router associated with the particular local monitoring device; calculate a metric based on a parameter of metadata associated with the network traffic received over the second period of time; determine, based on the metric, whether the network traffic received over the second period of time is anomalous; and in response to determining that the network traffic received over the second period of time is anomalous, transmit, to a central monitoring system, information indicating that the network traffic received over the second period of time is anomalous; and the central monitoring system comprising: at least one second processor that is programmed to: receive, from a first local monitoring device of the plurality of local monitoring devices, information indicating that the network traffic received over the second period of time is anomalous; receive, from the first local monitoring device, information related to the network traffic received by the first local monitoring device over the second period of time; determine, based on the information related to the network traffic received by the first local monitoring device over the second period of time, that the network traffic received by the first local monitoring device over the second period of time is anomalous; and in response to determining that the network traffic received by the first local monitoring device over the second period of time is anomalous, take an action to secure communications across a portion of the network associated with the first local monitoring device.

In some embodiments, the at least one processor is further programmed to determine whether the network traffic received over the second period of time is anomalous using the model of normal network traffic.

In some embodiments, the information related to the network traffic comprises the model of normal network traffic generated by the first local monitoring device.

In some embodiments, the metric comprises entropy of the parameter of metadata associated with the network traffic received over the second period of time.

In some embodiments, the parameter of metadata associated with the network traffic received over the second period of time comprises source IP address.

In some embodiments, the model of normal network traffic over the first period of time comprises a range based on an average entropy value of the parameter of metadata associated with the network traffic received over the second period of time.

In some embodiments, the action to secure communications across a portion of the network associated with the first local monitoring device comprises causing a user to be presented with an alert indicating that the network traffic received by the first local monitoring device over the second period of time was anomalous.

In some embodiments, the action to secure communications across a portion of the network associated with the first local monitoring device comprises causing the first local monitoring device to block traffic from a source IP address that caused the network traffic network traffic received by the first local monitoring device over the second period of time to be anomalous.

In some embodiments, the at least one processor comprises a field programmable gate array (FPGA), and wherein the at least one processor is programmed at least in part based on a configuration of logic gates in the FPGA.

In some embodiments, the at least one processor comprises an application specific integrated circuit (ASIC), and wherein the at least one processor is programmed at least in part based on a configuration of logic gates in the ASIC.

In accordance with some embodiments of the disclosed subject matter, an apparatus for distributed network monitoring is provided, the apparatus comprising: at least one processor that is programmed to: receive, over a first period of time, network traffic between at least one computing device and a networking router; generate a model of normal network traffic over the first period of time; receive, over a second period of time subsequent to the first period of time, network traffic between the at least one computing device and the networking router; calculate a metric based on a parameter of metadata associated with the network traffic received over the second period of time; determine, based on the metric, that the network traffic received over the second period of time is anomalous; and in response to determining that the network traffic received over the second period of time is anomalous, transmit, to a central monitoring system, information indicating that the network traffic received over the second period of time is anomalous.

In some embodiments, the at least one processor of the apparatus is further programmed to transmit the model of normal network traffic over the first period of time to the central monitoring system.

In some embodiments, the apparatus further comprises: a first Ethernet port; and a second Ethernet port, wherein the at least one processor that is further programmed to receive at least a portion of the network traffic received over the first period of time using the first Ethernet port.

In some embodiments, the at least one processor of the apparatus is further programmed to transmit at least the portion of the network traffic received over the first period of time to the one or more computing devices using the second Ethernet port.

In some embodiments, the at least one processor of the apparatus is further programmed to: receive at least a second portion of the network traffic received over the first period of time using the second Ethernet port; and transmit at least the second portion of the network traffic received over the first period of time to the networking router using the first Ethernet port.

In some embodiments, the metric comprises entropy of the parameter of metadata associated with the network traffic received over the second period of time.

In some embodiments, the parameter of metadata associated with the network traffic received over the second period of time comprises a destination port.

In some embodiments, the model of normal network traffic over the first period of time comprises a range based on an average entropy value of the parameter of metadata associated with the network traffic received over the second period of time.

In some embodiments, the at least one processor of the apparatus is further programmed to: receive, from the central monitoring system, an instruction to block traffic from a source IP address that caused the network traffic received by the apparatus over the second period of time to be anomalous.

In some embodiments, the at least one processor of the apparatus comprises a field programmable gate array (FPGA), and wherein the at least one processor is programmed at least in part based on a configuration of logic gates in the FPGA.

In accordance with some embodiments of the disclosed subject matter, a method for distributed network monitoring is provided, the method comprising: receiving, over a first period of time, network traffic between at least one computing device and a networking router; generating a model of normal network traffic over the first period of time; receiving, over a second period of time subsequent to the first period of time, network traffic between the at least one computing device and the networking router; calculating a metric based on a parameter of metadata associated with the network traffic received over the second period of time; determining, based on the metric, that the network traffic received over the second period of time is anomalous; and in response to determining that the network traffic received over the second period of time is anomalous, transmitting, to a central monitoring system, information indicating that the network traffic received over the second period of time is anomalous.

In some embodiments, the method further comprises transmitting the model of normal network traffic over the first period of time to the central monitoring system.

In some embodiments, the method further comprises receiving information indicating that the network traffic received over the second period of time is anomalous; receiving information related to the network traffic received over the second period of time; confirming, based on the information related to the network traffic received over the second period of time, that the network traffic received over the second period of time is anomalous; and in response to confirming that the network traffic received over the second period of time is anomalous, take an action to secure communications across a portion of the network associated with network traffic received over the second period of time.

In some embodiments, confirming that the network traffic received over the second period of time is anomalous comprises: identifying a cluster of local monitoring devices that includes a local monitoring device that received the network traffic over the second period of time; comparing the information related to the network traffic received over the second period of time to a second model of normal network traffic associated with a different local monitoring device in the cluster; and confirming that the network traffic received over the second period of time is anomalous based on the metric being anomalous compared to the second model of normal network traffic. In some embodiments, confirming that the network traffic received over the second period of time is anomalous comprises: identifying a cluster of local monitoring devices that includes a local monitoring device that received the network traffic over the second period of time; comparing the information related to the network traffic received over the second period of time to a third model of normal network traffic associated with the cluster of local monitoring devices, wherein the third model was generated based on models of normal network traffic associated with a plurality of local monitoring devices in the cluster; and confirming that the network traffic received over the second period of time is anomalous based on the metric being anomalous compared to the third model of normal network traffic.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can, for example, include systems, methods, and media) for distributed network monitoring using local monitoring devices are provided.

In accordance with some embodiments of the disclosed subject matter, mechanisms described herein can be used to implement local monitoring devices that can be used to implement a multi-level approach for monitoring large and complex computer networks. In some embodiments, such local monitoring devices can be small, low power, inexpensive, and deployed widely within an organization's intranet. For example, each local monitoring device can be placed to have visibility to, and responsibility for, providing monitoring or over watching a relatively small part of the overall network. In such an example, each local monitoring device can perform substantially real-time analysis of network traffic. In aggregate, mechanisms described herein can facilitate deployment of remote monitoring devices that can serve as a distributed and massively parallel processing system for network monitoring and/or protection.

In some embodiments, mechanisms described herein can be used to implement local monitoring devices that identify anomalous behaviors and/or detect threats. For example, in some embodiments, local monitoring devices can learn "normal" network behaviors from a local view of traffic, and detect anomalies using information entropy. In some embodiments, anomalous behaviors and/or detected threats can be transmitted to a central monitoring system that can be configured to evaluate the report in the greater context of the entire network. In some embodiments, a two-tiered separation of functions and time-scales facilitated by mechanisms described herein can dramatically reduce the overall cost, substantially reduce false positive alerts that plague modern network security operations centers, and/or extend the threat discovery and protection provided by an aggregate system.

In some embodiments, mechanisms described herein can be used to implement local monitoring devices that can be deployed widely within a network, and that can be implemented at a relatively low per-unit cost (e.g., compared to network security "probes").

Figure 1:
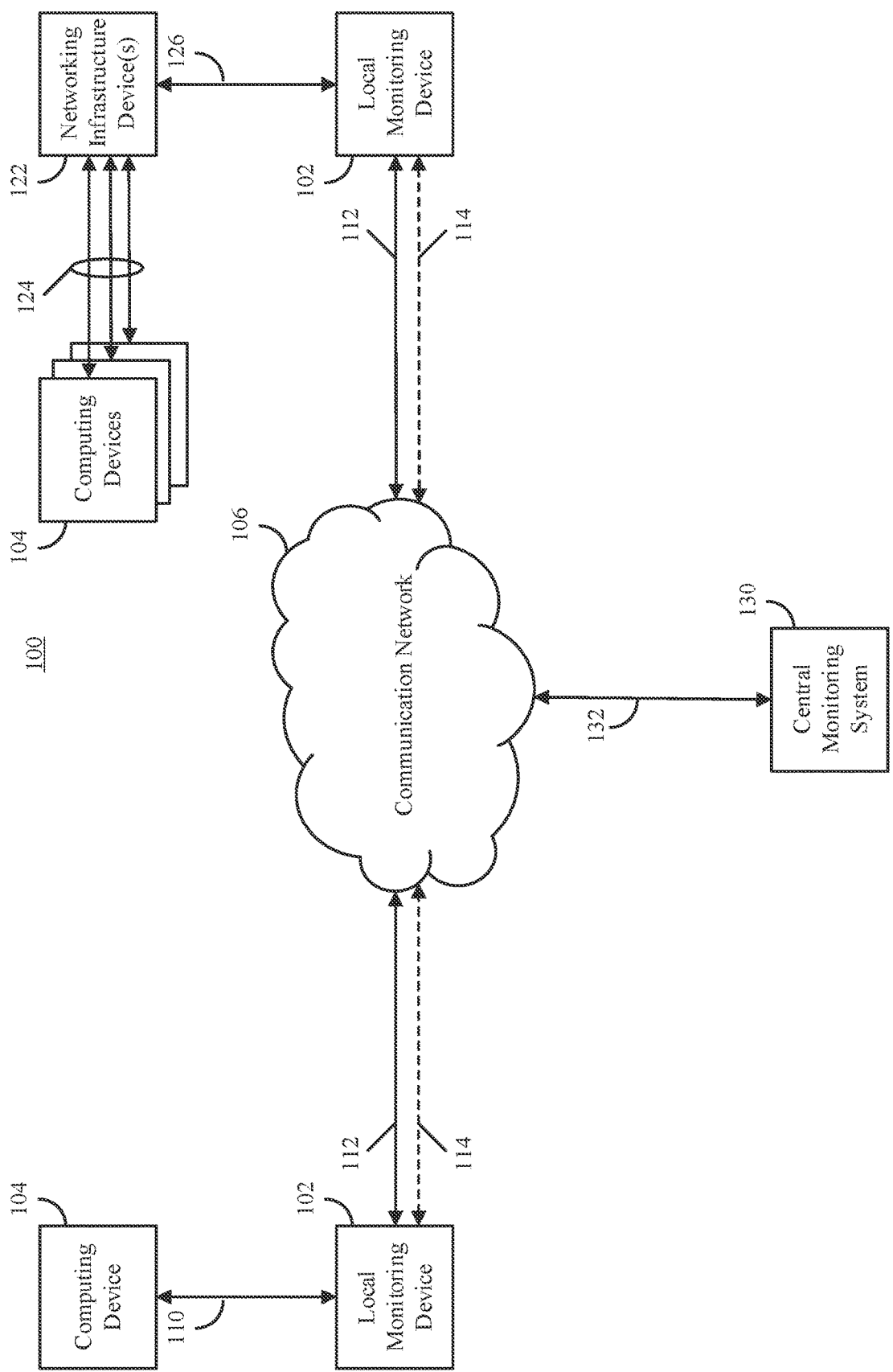
FIG. 1 shows an example of a system for distributed network monitoring using local monitoring devices in accordance with some embodiments of the disclosed subject matter.

FIG. 1 shows an example 100 of a system for distributed network monitoring using local monitoring devices in accordance with some embodiments of the disclosed subject matter. As shown in FIG. 1, system 100 can include various local monitoring devices 102, which can be used to monitor traffic communicated over a portion of a network, such as to one or more computing devices 104. In some embodiments, local monitoring device 102 can be connected at various points in a network. For example, local monitoring device 102 can be connected between an endpoint (e.g., a single computing device 104) and a communication network 106. For example, in some embodiments, a particular computing device 104 can connect to communication network 106 via a communication link 110, a particular local monitoring device 102, and a communication link 112. For example, communications link 110 and 112 can be wired or wireless networking links, such as an Ethernet link, a USB link, a Wi-Fi direct link, a Bluetooth link, or other type of local point to point connection, or any suitable combination thereof. In some embodiments, communication link 110 and communication link 112 can use the same communication protocol. Alternatively, in some embodiments, communication link 110 can use one protocol, while communication link 112 can use a different communication protocol.

In some embodiments, a particular computing device 104 can connect to communication network 106 via one or more networking infrastructure devices 122, one or more communication links 124, a particular local monitoring device 102, and a communication link 112. In some embodiments, networking infrastructure device 122 can be one or more wireless access points (e.g., a Wi-Fi access point), one or more networking switches, one or more networking routers, any other suitable networking infrastructure device, or any suitable combination therefore. For example, networking infrastructure device 122 can be a wireless access point connected between one or more computing devices 104 and a switch or router. In such an example, local monitoring device 102 can be connected between the access point and the router or switch. As another example, networking infrastructure device 122 can be a switch or router connected between multiple computing devices 104 and/or other networking infrastructure devices, and another router (e.g., functioning as a local router, or a network access gateway), a switch, etc. In some embodiments, computing device 104 can be any suitable computing device such as a personal computer, a laptop computer, a medical device, a tablet computer, a smartphone, a wearable computer, etc. In some embodiments, computing device 104 can be a virtualized device that is hosted by a physical computing device. For example, a single physical computing device can host one or more instances of virtual machines that appear and operate as independent computing devices to users of a data center using virtualization technologies. The single physical computing device can create, maintain, delete, and/or otherwise manage virtual machines in a dynamic manner. In some embodiments, various physical and/or virtual computing devices 104 can be associated with different combinations of operating systems or operating system configurations, virtualized hardware resources and software applications to enable a computing device to provide different functionality, and/or to provide similar functionalities more efficiently. Additionally, virtual machines can be partitioned into multiple isolated virtual systems, sometimes referred to as "containers." The virtual machine can control allocation of resources such as processing power and memory, and each container can be assigned its own resources which the container can use to, for example, execute software programs. In some embodiments, local monitoring device 102 can monitor communications to and/or from one or more physical computing devices that may or may not be executing one or more virtual machines. In such embodiments, local monitoring device 102 can independently monitor communications to and/or from a particular address (e.g., an IP address associated with a particular physical computing device, an IP address associated with a particular virtual machine, an IP address associated with multiple containers being executed by a virtual machine, etc.).

In some embodiments, local monitoring device 102 can connect to communication network 106 via communication link 112 (e.g., the same communication link used by computing device 104) or a communication link 114 that can use a different communication protocol than is used by computing devices 102 and/or communication link 114.

In some embodiments, communication network 106 can be any suitable communication network or combination of communication networks. For example, communication network 106 can be the Internet, an intranet, a wide-area network (WAN), a local-area network (LAN), a wireless network, a digital subscriber line (DSL) network, a frame relay network, an asynchronous transfer mode (ATM) network, a virtual private network (VPN), any other suitable communication network, or a suitable combination thereof. In some embodiments, communication network 106 can include a private or semi-private network, such as a corporate or university intranet. In some embodiments, communication network 106 can include one or more of a Wi-Fi network (which can include one or more wireless routers, one or more switches, etc.), a peer-to-peer network (e.g., a Bluetooth network, a Zigbee mesh network, etc.), a cellular network (e.g., a 3G network, a 4G network, etc., complying with any suitable standard, such as CDMA, GSM, LTE, LTE Advanced, WiMAX, etc.), a wired network, etc.

In some embodiments, system 100 can include one or more central monitoring devices 130. In some embodiments, central monitoring system 130 can connect to communication network 106 via a communication link 132. For example, communications link 132 can be a wired or wireless networking link, such as an Ethernet link or multiple Ethernet links, or any other type of suitable communication link. In some embodiments, central monitoring system 130 can be implemented using any suitable physical and/or virtual computing device such as a server or multiple servers, a virtual machine or multiple virtual machines, a "supercomputer," etc.

In some embodiments, each local monitoring device 102 can analyze a relatively small portion of overall network traffic on a particular network (e.g., a portion of a corporate intranet, a government intranet, etc.). For example, each local monitoring device 102 can be connected to a portion of the network that includes a relatively small number of endpoints, such as a single computing device (e.g., a single server, a single medical device, a single user computing device). As another example, a particular local monitoring device 102 can be connected to multiple computing devices (e.g., multiple servers, multiple medical devices, and/or multiple user computing devices).

In some embodiments, each local monitoring device 102 can learn what behaviors are normal on that portion of the network, and build one or more traffic models to detect anomalous behaviors on that portion of the network. In some embodiments, traffic models can be exchanged among local monitoring devices 102 and central monitoring system 130. In some embodiments, a dual-level approach utilizing local monitoring devices and one or more central monitoring systems 130, when deployed widely on a network, can increase visibility into the network, and distribute portions of the network analysis workload between the periphery of the network and a central monitoring system 130.

In some embodiments, local monitoring devices can be used in connection with networked medical devices (e.g., infusion pumps, CT scanners, MRI scanners, etc.) that can be difficult to secure through software installed on the device. For example, due to the difficulty and expense of FDA approval processes, such networked medical devices are seldom patched or updated, leaving them vulnerable. The ability to mass produce local monitoring devices 102 and deploy them widely can facilitate cost effective deployment of network security infrastructure.

In some embodiments, local monitoring devices 102 can be configured as "bump in the wire" devices, using low power technology, which can facilitate wide deployment in a cost effective manner. For example, local monitoring devices 102 can be configured as a dongle that can be connected between a network interface of a computing device 104 and an upstream portion of the network. As another example, local monitoring devices 102 can be configured as a dongle that can be connected between a networking infrastructure device 122 and an upstream portion of the network.

As described below, local monitoring devices 102 operate in conjunction with, and in some embodiments under the direction of, central monitoring system 130. In some embodiments, central monitoring system 130 can communicate with local monitoring devices 102, collect alerts, and/or distribute model parameters. In some embodiments, local monitoring devices 102 can each be configured to evaluate traffic and report potential threats, and central monitoring system 130 can evaluate reports received from local monitoring devices 102 in the context of the entire network. In some embodiments, central monitoring system 130 can identify non-threatening behaviors that were identified as potentially malicious (e.g., anomalous) by a particular local monitoring device 102 but that have appeared with enough regularity elsewhere in the network that they can be identified with relatively high confidence as non-malicious, which can reduce the incidence of false positive alerts. In some embodiments, central monitoring system 130 can also serve as a repository for known benign traffic patterns, and can share those models with local monitoring devices 102 in appropriate portions of the network.

In some embodiments, local monitoring devices 102 can be placed near any networked device, including devices such as printers and Internet of Things (IoT) devices which typically lack the computational resources to self-monitor (e.g., using malware scanning software). Additionally, as described above, local monitoring devices 102 can be placed near networked medical devices and other systems that cannot be patched (e.g., because of regulatory or certification concerns) to eliminate known vulnerabilities. Additionally, local monitoring devices 102 can continue to operate even if a downstream networked device is compromised by malware or other malfunction, whereas malware scanning software used to protect networked devices can be compromised by malware or a malfunction leaving such a networked device unprotected. In some embodiments, the ability of local monitoring devices 102 to learn about local network behavior, compare new traffic to the learned model parameters, and detect and report anomalies can facilitate cost-effective network security. For example, because each local monitoring device 102 has visibility into only a small portion of the network, there are fewer normal behaviors to be characterized than for a centralized system that attempts to model normal behavior for an entire network. This can facilitate local monitoring devices 102 generating relatively simple parameterized models that are able to detect traffic patterns that are unusual for the part of the network being monitored.

In some embodiments, local monitoring devices 102 can be implemented using a CPU to perform networking and analysis tasks. This can result in relatively flexible devices based on the ability of a CPU to execute any suitable software, but may come at the cost of performance. For example, while such devices can support communication using 100 Mbps Ethernet interfaces, computational costs related to encryption can limit performance to a lower throughput (e.g., less 10 Mbps).

In some embodiments, local monitoring devices 102 can be implemented using a field programmable gate array (FPGA) to perform networking and analysis tasks. This can result in less flexible devices (e.g., FPGAs can be reprogrammed, but are relatively inflexible compared to CPUs) that have higher performance. For example, an FPGA-based device can economically support 1 Gbps Ethernet interfaces (e.g., by implementing encryption and analysis functions in logic).

In some embodiments, local monitoring devices 102 can be implemented using an application specific integrated circuit (ASIC) to perform networking and analysis tasks. ASIC-based devices can be configured to support any network interface and any level of performance, at a cost of flexibility and increased development time. For example, an advantage of ASIC implementations is high performance for the specific task(s) the ASIC is configured to perform, and low per-unit cost in the long term.

In some embodiments, local monitoring devices 102 can generate a model of network traffic based on the entropy of the traffic (e.g., as described below in connection with 406 of FIG. 4). For example, entropy can be calculated for multiple different metadata parameters and each individual measure of entropy can be used independently as a relatively simple anomaly detection approach based on computing the entropy of multiple different metadata parameters. As another example, more sophisticated metrics can be employed, such as conditional entropy and/or Tsallis entropy (e.g., as described in Tellenback et al., "Accurate Network Anomaly Classification with Generalized Entropy Metrics," Computer Networks, vol. 55, no. 15, pp. 3485-3502 (2011) DOI: 10.1016/j.connect.2011.07.008, which is hereby incorporated herein by reference in its entirety). In such an example, using conditional and/or Tsallis entropy can allow local monitoring device 102 to effectively recognize details and/or outliers at various scales. In some embodiments, operators that can be used to implement entropy calculations can include addition, multiplication, and a logarithm function, which can be implemented as a lookup table. Additionally or alternatively, in some embodiments, local monitoring devices 102 can generate a model based on any other suitable network analysis. For example, local monitoring devices 102 can perform a signature test (e.g., using one or more deep packet inspection techniques). As another example, local monitoring devices 102 can compare addresses (e.g., source address, destination address) to a list of explicitly allowed and/or explicitly disallowed addresses (which are sometimes referred to as whitelist and blacklists, respectively). As yet another example, local monitoring devices 102 can generate a model based on temporal patterns in the network traffic. As still another example, local monitoring devices 102 can generate a model based on scanning activity that can be used to detect scanning patterns that may be anomalous.

In some embodiments, local monitoring devices 102 can use one or more probability functions to compare an entropy value for a point in time to a historical normal. In such embodiments, a probability function can be implemented as discrete histograms, which might have dozens or hundreds of counter bins plus a division operator. Accordingly, in some embodiments, it is not necessary to compute both probability and entropy at high clock speed, which can relax logic performance requirements for a circuit that is implemented to use a probability function that compares new data to a historical "normal" and to an entropy calculation.

In some embodiments, the amount of memory needed by a local computing device can vary depending on the number of entropy values calculated and/or a resolution of probability histograms.

In some embodiments, local monitoring devices 102 and central monitoring system 130 can form a multi-level network monitoring system, which can require careful implementation of multiple communication protocols (e.g., in addition to the networking communication between computing devices 102 and communication network 106). For example, there can be communications between local monitoring devices 102 and central monitoring system 130, which can use one or more communication protocols. As another example, there can be communications between central monitoring system 130 and other network defense systems, such as a security information and event management (SIEM) system.

In some embodiments, central monitoring system 130 can communicate with local monitoring devices 102, which can include sending commands to specific local monitoring devices 102, receiving reports of anomalous behaviors from specific local monitoring devices 102, and sending patterns of expected behaviors (e.g., models) to specific local monitoring devices 102. In some embodiments, this communication can be implemented on a command and control network that is separate from the network being monitored, in which case the implementation could use any robust communication protocol. For example, communication links 112 can be command and control network links. Additionally or alternatively, in some embodiments, central monitoring system 130 can communicate with local monitoring devices 102 using an "in band" communication channel over the monitored network. In such embodiments, central monitoring system 130 and local monitoring devices 102 must employ protocols supported by the monitored network to use it to communicate with one another. For example, central monitoring system 130 and local monitoring devices 102 can use transmission control protocol/Internet protocol (TCP/IP), and/or any suitable lighter weight alternative such as user datagram protocol (UDP) and various protocols developed for IoT applications, such as MQ telemetry transport (MQTT) protocol.

In some embodiments, implementation of the local monitoring devices 102 can also impact communications protocols. For example, a local monitoring device 102 can be configured to protect a single computing device (e.g., a networked medical scanner). In such an example, central monitoring system 130 can address communications (e.g., command and/or control packets) intended for a particular local monitoring device 102 to an address associated with the computing device being protected. In such an implementation, local monitoring device 102 can intercept communications intended for that local monitoring device 102 from the traffic addressed to the network device. Additionally or alternatively, in some embodiments, local monitoring devices 102 can be assigned a network address (e.g., on a command and control network and/or on the monitored network) to facilitate communications to specific local monitoring devices 102.

In some embodiments, central monitoring system 130 can be configured to communicate with other network defense systems, such as an SIEM, one or more network asset and configuration managers, and other systems. For example, central monitoring system 130 can be configured to communicate information relevant to a real-time network behavioral model to such network defense systems.

All of the communication protocols utilized by central monitoring system 130 and/or local monitoring device 102 can be secured, as a compromised network monitoring system can be a point of entry into the network and/or can compromise the security of other portions of the network. For example, in some embodiments, communications between central monitoring system 130 and local monitoring devices 102 can be encrypted and/or otherwise secured (e.g., authenticated by digital signatures). As another example, an authentication system(s) and/or a dedicated repository of digital identity management can be used to secure communications on the command and control network and/or the network being monitored.

In some embodiments, deployment of local monitoring devices 102 near the periphery of the network being monitored can reduce the computational resources required at central monitoring system 130 (e.g., compared to a system that is implemented through monitoring closer to the core of the network). For example, state-of-the-art behavioral analysis of network metadata on large corporate networks is generally very challenging, due to the size and complexity of the data. Such centralized monitoring generally requires substantial collection and analysis efforts, often requiring a "supercomputer" or dedicated private cloud resources. In some embodiments, deploying local monitoring devices 102 near the periphery of the network being monitored can offload many tasks from the central analysis server, and can replace extensive raw data collection with compact behavioral models that can reduce data collection and analysis workloads.

In some embodiments, central monitoring system 130 can implement multiple functions. For example, central monitoring system 130 can serve as a repository of models characterizing known network behaviors. In such an example, particular local monitoring devices 102 can report anomalous behaviors (or otherwise potentially malicious activity) discovered in the portion of the network being monitored by that particular local monitoring device 102 to central monitoring system 130. In some embodiments, central monitoring system 130 can determine if the activity identified by a particular local monitoring device 102 is relatively common throughout the network (e.g., based on traffic models from other local monitoring devices). If the activity is relatively common, central monitoring system 130 can avoid generating a false positive, and central monitoring system 130 can more accurately identify activity that is truly anomalous. As another example, central monitoring system 130 can provide an additional layer of analysis and/or more sophisticated analysis. In such an example, central monitoring system 130 can access more computational resources than an individual local monitoring device. This can facilitate analysis using more sophisticated techniques. Additionally, this can facilitate analysis using additional data from different portions of the network being monitored, as reports from local monitoring devices 102 across the network can provide visibility into a larger portion of the network (e.g., the entire network). As yet another example, central monitoring system 130 can serve as a command and control point for local monitoring devices 102 on the network by instructing one or more local monitoring devices 102 to block certain network activity (e.g., communications to and/or from a particular computing device(s), communications using one or more ports, etc.).

In some embodiments, central monitoring system 130 can act as (and/or have access to) a repository of traffic models (e.g., implemented as a catalog) and/or a database of active local monitoring devices 102.

For example, central monitoring system 130 can include (and/or have access to) a database of local monitoring devices 102. In such an example, a monitoring device database can include device identity information, device capability information, device network location information, device physical location information, encryption information (e.g., information about a public and/or private key used by a particular local monitoring device, information about an encryption scheme used by the device), and/or any other suitable information that can be used to support local monitoring devices 102. In some embodiments, the device database can be formatted and/or implemented using any suitable technique or combination of techniques. For example, the database can be implemented files formatted using JavaScript Object Notation (JSON) or hierarchical data format version 5 (HDF5). As another example, the database can be implemented using relational database techniques. As yet another example, the database can be implemented using object-based database techniques. As still another example, the database can be implemented using cluster storage techniques, such as Hadoop distributed file system (HDFS) or Apache Hive.

Additionally or alternatively, in some embodiments, central monitoring system 130 can include (and/or have access to) a catalog of traffic patterns to support network monitoring. In some embodiments, central monitoring system 130 can include (and/or have access to) a catalog of network traffic patterns representing both "good" (e.g., normal and/or non-malicious) and "bad" (e.g., malicious and/or anomalous) network behaviors. Additionally, in some embodiments, central monitoring system 130 can include (and/or have access to) information that can be used to distinguish pattern matches from anomalous (previously unseen) behaviors. In some embodiments, such a traffic pattern catalog can be implemented using technologies described above in connection with the device database. Additionally or alternatively, in some embodiments, such a traffic pattern catalog can be implemented using a graph database. For example, a traffic pattern catalog can be implemented using a Neo4J graph database platform. As another example, such a traffic pattern catalog can be implemented on a Cray Graph Engine (CGE). As yet another example, such a traffic pattern catalog can be implemented using any other suitable sparse, hierarchical, and/or hybrid data store that is configured to handle graph-like structures.

In some embodiments, central monitoring system 130 can include (and/or have access to) a repository of information about the network being monitored. For example, such a repository can include network topology information. As another example, such a repository can include information about network devices (e.g., computing devices) included in the network, and/or networked devices being protected by local monitoring devices 102 (and/or a specific local monitoring device 102).

In some embodiments, central monitoring system 130 can have access to traffic patterns observed by each local monitoring device 102, and/or behavioral patterns that are expected for each network device. In some embodiments, in addition to information about the network, central monitoring system 130 can maintain a model or multiple models of current and previous network activity for global analysis of network behavior. In some embodiments, the model or models can be generated based on information received from one or more local monitoring devices. For example, central monitoring system 130 can receive models of normal network traffic from various local monitoring devices 102 and/or data related to the models. In such an example, central monitoring system 130 can analyze the models of normal network traffic to identify patterns that occur in one or more portions of the network being monitored by central monitoring system 130 and/or the local monitoring devices 102. In some embodiments, central monitoring system 130 can generate one or more models that synthesize the information from the different local monitoring devices based on the analysis. For example, many of the local monitoring devices may collect information indicating that a network device being monitored communicates with a remote server at a particular address (which corresponds to a corporate DNS server), followed shortly by traffic being sent to the network device on port 80. Local monitoring devices at various points in the network may observe a similar pattern, which can represent a request for an IP address corresponding to a particular domain name (e.g., a website), and HTTP content being sent to the device being monitored using port 80. As another example, certain local monitoring devices may collect information indicating that a network device being monitored uses a particular port to communicate with a particular address at regular intervals (e.g., every 15 minutes while the device is active). This may correspond to an application installed on the device sending a signal to a license server that authorizes use of the application. In such examples, central monitoring device 130 can identify such activity as normal traffic patterns based on the activity occurring regularly at many different network devices. In some embodiments, such network datasets and models of network activity can be implemented using one or more techniques described above in connection with the database of local monitoring devices 102 and/or the catalog of traffic patterns.

In some embodiments, central monitoring system 130 can perform a number of analyses of network data, behavioral patterns, and information from the distributed local monitoring devices 102. In some embodiments, these analyses can include behavioral pattern extraction and comparison, and anomaly detection. Additionally, in some embodiments, these analyses can be based on any suitable algorithm(s), such as community detection or centrality analysis.

In some embodiments, central monitoring system 130 can be implemented with multiple interfaces. For example, central monitoring system 130 can be implemented with a network interface that facilitates communication with one or more local monitoring devices. As another example, central monitoring system 130 can be implemented with an interface that facilitates direct access to SIEM systems and/or network asset management systems. In some embodiments, central monitoring system 130 can be configured to have real-time access to other network management and security systems that are implemented to monitor the same network (e.g., an SIEM, a network asset management system, etc.). For example, such access can facilitate sharing of analytical data collected by such other systems. As another example, such access can facilitate sharing of security event notifications.

In some embodiments, central monitoring system 130 can be implemented with one or more interfaces that facilitate control of central monitoring system 130 and/or local monitoring devices 102 by a user (e.g., a user responsible for security of the network). For example, central monitoring system 130 can be implemented with an interface that can accept instructions to add, remove, and/or update information about local monitoring devices 102 that are deployed. As another example, central monitoring system 130 can be implemented with an interface that facilitates validation and/or monitoring of the operational health of the entire network of local monitoring devices 102 (e.g., by a user responsible for security of the network). In some embodiments, central monitoring system 130 can be implemented with an interface that facilitates access to behavioral modeling and/or algorithms by one or more users (e.g., a user responsible for security of the network). In such an example, such access can facilitate analysis of security incidents using the data collected by local monitoring devices 102.

In some embodiments, central monitoring system 130 can be located locally or remotely from local monitoring devices 120 and/or computing devices 104. Additionally, in some embodiments, multiple central monitoring devices can be used (which may be located in different physical locations) to provide redundancy, to provide load balancing, etc.

Figure 2:
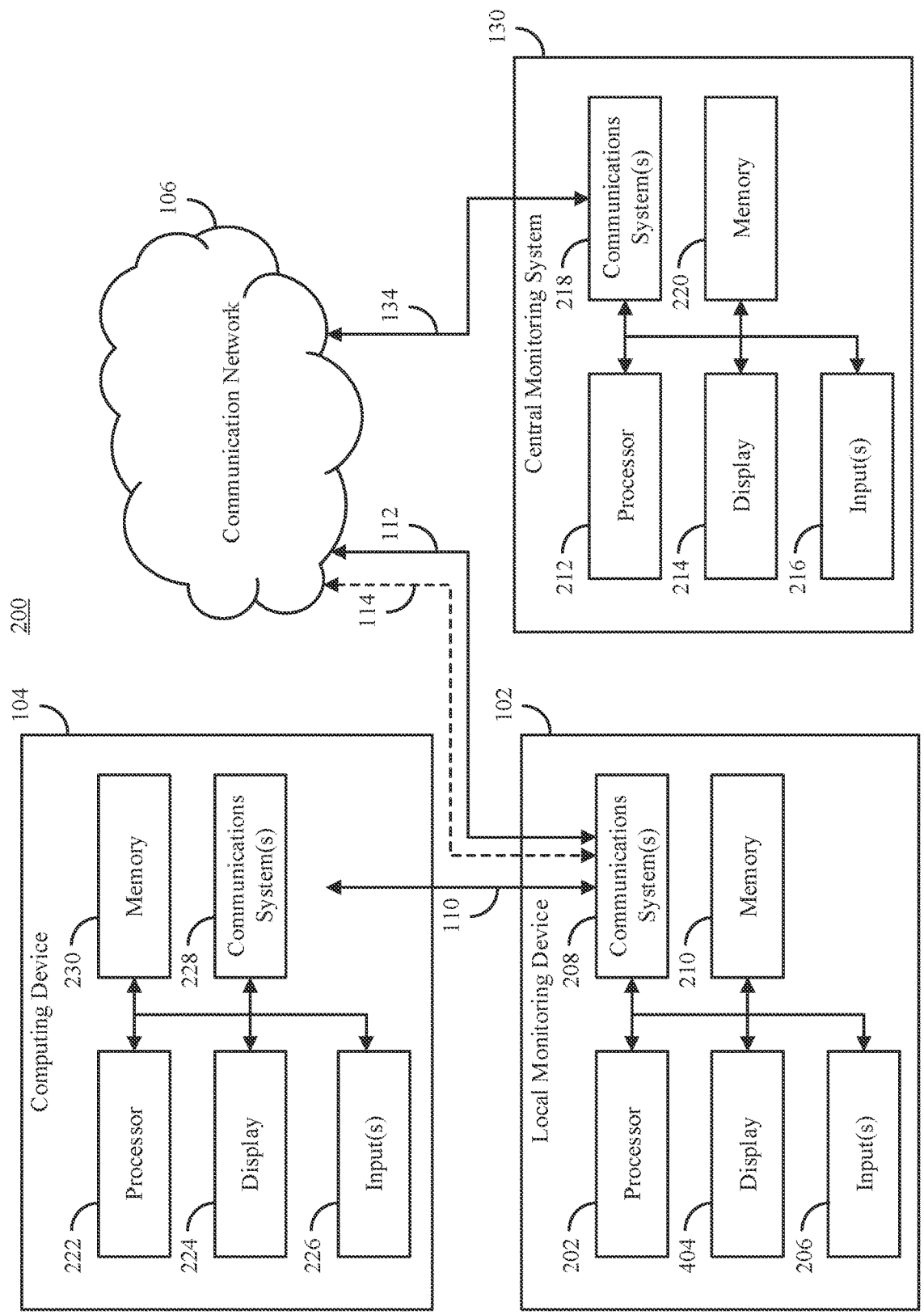
FIG. 2 shows an example of hardware that can be used to implement a local monitoring device, a central monitoring system, and a computing device of FIG. 1 in accordance with some embodiments of the disclosed subject matter.

FIG. 2 shows an example of hardware that can be used to implement a local monitoring device, a central monitoring system, and a computing device of FIG. 1 in accordance with some embodiments of the disclosed subject matter. As shown in FIG. 2, in some embodiments, local monitoring device 102 can include a processor 202, a display 204, one or more inputs 206, one or more communication systems 208, and/or memory 210. In some embodiments, processor 202 can be any suitable hardware processor or combination of processors, such as a central processing unit (CPU), a graphics processing unit (GPU), a field programmable gate array (FPGA), an application specific integrated circuit (ASIC), etc. In some embodiments, display 204 can include any suitable display device(s). For example, display 204 can be implemented using a one dimensional display. In a more particular example, display 204 can be implemented using one or more light emitting diodes (LEDs) that are each configured to indicate status information of local monitoring device 102 using a one dimensional display (e.g., each LED can be used to indicate a single status indicator, a single LED can be used to communicate status information through a sequence of flashes of one or more colors). In such an example, a single LED can be used to indicate whether power is being received, whether a particular type of error has occurred, etc. As another example, display 204 can be implemented using any suitable two dimensional display (e.g., a 7 segment LED display, an electronic paper display, an organic LED (OLED)-based display, etc.). In such an example, display 204 can be configured to present information about local monitoring device 102 and/or the status of local monitoring device 102. In some embodiments, display 204 can be omitted.

In some embodiments, input(s) 206 can include any suitable input device(s) and/or sensor(s) that can be used to receive user input, such as a button, a Hall-effect sensor, etc. For example, input(s) 206 can be used to perform a hardware reset of local monitoring device 102. In some embodiments, input(s) 206 can be omitted.

In some embodiments, communications systems 208 can include any suitable hardware, firmware, and/or software for communicating information over communication links 110, 112, and/or 114, and for communicating information using network 206 and/or any other suitable communication networks. For example, communications systems 208 can include one or more transceivers, one or more communication chips and/or chip sets, etc. In a more particular example, communications systems 208 can include hardware, firmware and/or software that can be used to establish an Ethernet connection, a USB connection, a Wi-Fi connection, a Bluetooth connection, a cellular connection, and/or any other suitable connection.

In some embodiments, memory 210 can include any suitable storage device or devices that can be used to store instructions, values, etc., that can be used, for example, by processor 202 to record information about network traffic being sent via local monitoring device 102, to generate one or more entropy values, to store one or more entropy values, to store one or more models representing behavioral patterns or pattern components, to analyze network traffic, to communicate with central monitoring system 130 via communications system(s) 208, etc. Memory 210 can include any suitable volatile memory, non-volatile memory, storage, any other suitable type of storage medium, or any suitable combination thereof. For example, memory 210 can include RAM, ROM, EEPROM, one or more flash drives, one or more hard disks, one or more solid state drives, one or more optical drives, etc. In some embodiments, memory 210 can have encoded thereon a computer program for controlling at least a portion of operations of local monitoring device 102. In some such embodiments, processor 202 can execute at least a portion of the computer program to present record and analyze network traffic sent to and/or from one or more computing devices on the network being monitored, to receive information from central monitoring system 130, to transmit information to central monitoring system 130, etc.

In some embodiments, central monitoring system 130 can include a processor 212, a display 214, one or more inputs 216, one or more communication systems 218, and/or memory 220. In some embodiments, processor 212 can be any suitable hardware processor or combination of processors, such as a CPU, a GPU, an FPGA, an ASIC, etc. In some embodiments, display 214 can include any suitable display devices, such as a computer monitor, a touchscreen, a television, etc. In some embodiments, display 214 can be omitted. In some embodiments, inputs 216 can include any suitable input devices and/or sensors that can be used to receive user input, such as a keyboard, a mouse, a touchscreen, a microphone, etc. In some embodiments, inputs 216 can be omitted.

In some embodiments, communications systems 218 can include any suitable hardware, firmware, and/or software for communicating information over communication network 106 and/or any other suitable communication networks. For example, communications systems 218 can include one or more transceivers, one or more communication chips and/or chip sets, etc. In a more particular example, communications systems 218 can include hardware, firmware and/or software that can be used to establish an Ethernet connection, a Wi-Fi connection, a Bluetooth connection, a cellular connection, etc.

In some embodiments, memory 220 can include any suitable storage device or devices that can be used to store instructions, values, etc., that can be used, for example, by processor 212 to communicate with one or more local monitoring devices 102, analyze network traffic, etc. Memory 220 can include any suitable volatile memory, non-volatile memory, storage, any other suitable type of storage medium, or any suitable combination thereof. For example, memory 220 can include RAM, ROM, EEPROM, one or more flash drives, one or more hard disks, one or more solid state drives, one or more optical drives, etc. In some embodiments, memory 220 can have encoded thereon a server program for controlling operation of central monitoring system 130. In such embodiments, processor 212 can execute at least a portion of the computer program to receive information from one or more local monitoring devices 102, analyze network traffic sent to and/or from one or more computing devices 104, etc.

In some embodiments, computing device 104 can include can include a processor 222, a display 224, one or more inputs 226, one or more communication systems 228, and/or memory 230. In some embodiments, processor 222 can be any suitable hardware processor or combination of processors, such as a CPU, a GPU, an FPGA, an ASIC, etc. In some embodiments, display 224 can include any suitable display devices, such as a computer monitor, a touchscreen, a television, etc. In some embodiments, display 224 can be omitted. In some embodiments, inputs 226 can include any suitable input devices and/or sensors that can be used to receive user input, such as a keyboard, a mouse, a touchscreen, a microphone, etc. In some embodiments, inputs 226 can be omitted.

In some embodiments, communications systems 228 can include any suitable hardware, firmware, and/or software for communicating information over communication network 106 and/or any other suitable communication networks. For example, communications systems 228 can include one or more transceivers, one or more communication chips and/or chip sets, etc. In a more particular example, communications systems 228 can include hardware, firmware and/or software that can be used to establish an Ethernet connection, a Wi-Fi connection, a Bluetooth connection, a cellular connection, etc.

In some embodiments, memory 230 can include any suitable storage device or devices that can be used to store instructions, values, etc., that can be used, for example, by processor 222 to communication with one or more local monitoring devices 102, analyze network traffic, etc. Memory 230 can include any suitable volatile memory, non-volatile memory, storage, any other suitable type of storage medium, or any suitable combination thereof. For example, memory 230 can include RAM, ROM, EEPROM, one or more flash drives, one or more hard disks, one or more solid state drives, one or more optical drives, etc. In some embodiments, memory 230 can have encoded thereon a server program for controlling operation of computing device 104. In such embodiments, processor 222 can execute at least a portion of the computer program to receive data via one or more local monitoring devices 102, present content (e.g., via display 224), perform any other suitable functions (e.g., carry out a CT scan, carry out an MRI scan, monitor a patient's condition, etc.), etc.

Figure 3:
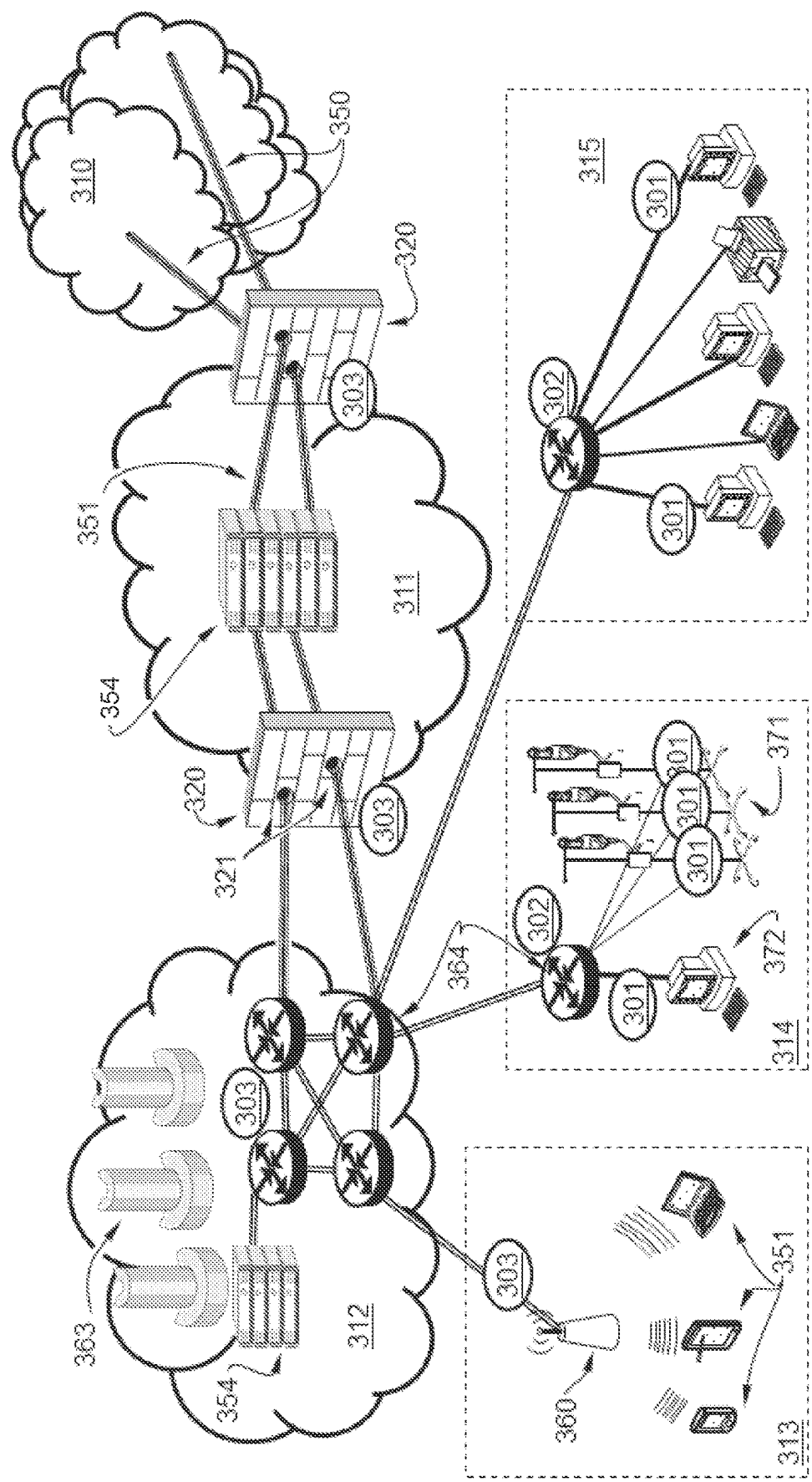
FIG. 3 shows a more particular example of a system for distributed network monitoring using local monitoring devices in accordance with some embodiments of the disclosed subject matter.

FIG. 3 shows a more particular example of a system for distributed network monitoring using local monitoring devices in accordance with some embodiments of the disclosed subject matter.

As shown in FIG. 3, an intranet can include various computing devices and/or network infrastructure, and can include various subnets. In some embodiments, local monitoring devices can be placed in connection with individual networked systems, and/or at key points in the network infrastructure. For example, a local monitoring device 102 can be connected at a location 301 that facilitates monitoring of an individual networked system. In such an example, the local monitoring device 102 can be used to monitor and protect individual systems, including networked devices such as printers or clinical equipment. As another example, a local monitoring device 102 can be connected at a location 302 between routing infrastructure and an upstream portion of the network and/or can be connected to a switched port analyzer (SPAN) port or other monitoring port. In such an example, if the networking equipment (e.g., a router) is implemented with a SPAN or monitor port, the local monitoring device can be connected to such a port. However, this is merely an example, and the local monitoring device can be connected to intercept all traffic sent to and/or from an upstream side of the network equipment. Note that connection to a SPAN or monitoring port is not necessarily a "bump in the wire" configuration, but it can allow for more flexibility by configuring the router to only show certain traffic on the SPAN or monitoring port.

As another example, a local monitoring device 102 can be connected at a key point 303 in the network, such as upstream of a wireless access point 360 (e.g., to monitor wireless devices 362 connecting to the network), to a network device that implements a firewall 320 in order to monitor one or more firewall access controlled ports 321, between network routers 364 and/or other network infrastructure in a data center 312 (e.g., one or more severs 354, one or more supercomputers 363, etc.). Note that network routers are merely an example, and local monitoring devices can be associated with other types of network infrastructure devices, such as a network bridge, a switch, a repeater, and/or any other device that is used for connection of a tree, star, ring, or other topology for facilitating communication and interconnection across a communication network.

In some embodiments, placing local monitoring devices 102 at locations (e.g., locations 301, 302, and/or 303) at different points in the network can facilitate monitoring traffic patterns of particular devices (e.g., devices that cannot be efficiently secured via software) to monitoring traffic patterns to a large portion of the network. For example, local monitoring devices 102 placed at locations 301 in connection with individual networked devices, such as medical equipment 371 or computing devices 372 (e.g., local management workstations), can facilitate monitoring of traffic to and/or from those devices, and can generate a model of behavior by those devices that can be used to classify behavior by other similar devices located elsewhere in the network (or potentially in another network).

As another example, local monitoring devices 102 placed at locations 302 in connection with network infrastructure such as routers 364 can facilitate monitoring of traffic to and/or from devices served by the router 364 and/or can be used to generate a model of an entire portion of the network (e.g., a subnet). In more particular examples, local monitoring devices 102 placed at locations 302 can be used to monitor a department LAN 315, a medical equipment zone 314, and/or any other suitable portion of a network.

As yet another example, local monitoring devices 102 placed at locations 303 in connection with key points in a network, such as wireless access points 360, data center 312, firewall 320, and/or any other suitable key points, can be used to generate a model of traffic that traverses such key points, such as data being transmitted to and/or from the Internet 310 via one or more external trunk connections 350, data being transmitted via firewall access controlled port 321, data being transmitted within a firewalled zone 311 (which is sometimes referred to as a demilitarized zone), and/or traffic being transmitted via any other portion of the network.

Note that the locations at which local monitoring devices can be placed that are described above are merely examples of locations at which a local monitoring device can be placed. A local monitoring device can be placed in connection with any link in a network and/or any leaf interconnect from any node of a network.

Figure 4:
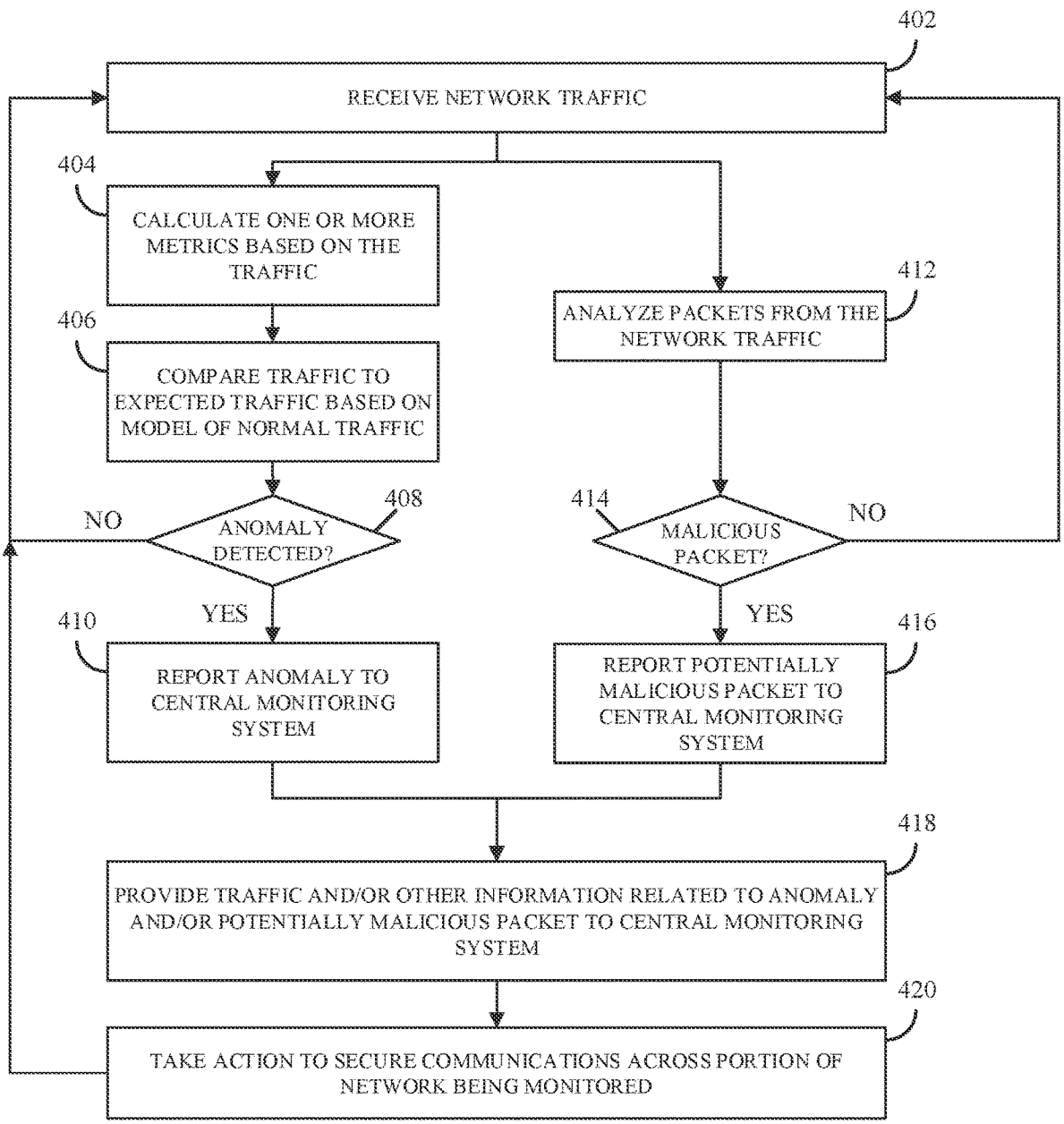
FIG. 4 shows an example of a process for monitoring a portion of a network using a local monitoring device in accordance with some embodiments of the disclosed subject matter.

FIG. 4 shows an example of a process for monitoring a portion of a network using a local monitoring device in accordance with some embodiments of the disclosed subject matter. At 402, process 400 can receive network traffic sent to and/or from a particular computing device or computing devices on a monitored network.

At 404, process 400 can calculate one or more metrics based on the network traffic. For example, process 400 can calculate entropy associated with one or more characteristics of the network traffic. Network traffic metadata provides a relatively large set of parameters that can be used to calculate entropy. Examples of such parameters include source address, destination address, source port, destination port (note that source port and/or destination port are often associated with specific applications), packet size (e.g., in bytes, in bits), quantities of traffic (e.g., in packets over time, in bits over time, in bytes over time), protocol types, protocol-specific flags and/or features, among others.

Entropy can be used to describe the amount of information in a set of symbols, and can be a useful way to distinguish common (expected) and unusual (anomalous) sets. Shannon defined entropy H (note that this symbol is Eta, not the English letter H) of a discrete random variable X with possible values $\{x_1, \ldots, x_n\}$ in terms of the probability mass function P (X) can be represented using the following relationship:

$$H(X) = -\Sum_{i=0}^{n} P(x_i) \log_b P(x_i). \quad (1)$$

Note that when the log base, b, is equal to 2, the units of entropy can be referred to as "shannons," and are often referred to as bits. In some embodiments, the entropy model can be based on the data observed within a particular time period (e.g., one minute, ten minutes, thirty minutes, one hour, two hours, twelve hours, one day, or other suitable period of time), while considering the cyclical nature of network traffic (e.g., reduced traffic outside of core business hours) on the probability mass function.. In some embodiments, the model can be reset after a predetermined period of time has elapsed. In such embodiments, entropy can be calculated based on the data accumulated over each time period.

In some embodiments, process 400 can characterize network traffic using a relatively simple entropy model. For example, process 400 can determine an entropy value (e.g., based on EQ. (1)) to one or more parameters independently. In such an example, the parameters used to characterize the network traffic can include any suitable parameters, such as source address, destination address, source port, destination port, number of bytes, information about a protocol being used, etc. In some embodiments, the entropy value for each of the parameters can be expected to be relatively constant over time, but anomalous behavior may significantly change the entropy.

In some embodiments, process 400 can characterize network traffic using a more complex entropy model. For example, process 400 can use conditional entropy (e.g., based on joint probabilities of multiple parameters), using additional parameters, and/or aggregation of entropy values.

In a particular example, a local monitoring device 102 can be used to monitor a network print server that normally communicates with three printers and ten clients (e.g., computing devices 104). From day to day, the entropy (or information content) of destination addresses of traffic from that print server can be expected to be relatively stable regardless of the amount of traffic sent to and from the print server. Even on a very busy day, the information content of the destination addresses would be the same, despite an increase in traffic quantity. If a printer was replaced, destination address entropy would temporarily increase, but entropy for the other parameters would likely be stable. However, if the print server became compromised malware and used for network reconnaissance, the malware may cause the print server to probe other network systems that the print server does not normally communicate with. This would be expected to change several entropy values. In such an example, the additional communications caused by the malware would be likely to increase the number of different destination addresses, and such new information would create a spike in the destination address entropy value. Similarly, the size of the packets (e.g., in bytes) sent to probe other systems, and the protocol used may be uniform, which would lower other entropy values (also representing a change in entropy from an expected value).

As another more particular example, incoming network traffic was analyzed for a single web server on the Mayo network. The network metadata showed that the particular web server received approximately 8,000 flows every ten minutes, which were dominated by web service requests and interactions with SQL database servers. Each flow record can include a summary of network traffic (sometimes simply referred to as metadata), and can include source address, destination address, source port, destination port, communication protocol (e.g., TCP, UDP), number of bytes, duration, flags, etc. The entropy for metadata parameters was calculated every ten minutes for five hours, creating a time series of entropy values for each parameter. For data such as port numbers, and addresses, the number of flows in which each occurred were counted, which can be implemented via a hash table. Numerical data (e.g., bytes), can be accumulated over the time period to be used to calculate entropy. The parameters analyzed included source address, destination address, source port, destination port, protocol, TCP flags, numbers of bytes in each flow (e.g., across all packets), number of packets in each flow, and flow duration (e.g., in seconds). An anomaly was intentionally introduced at 12:00 by copying traffic records from another server into the data. Normal behavior and the anomaly are plotted in FIG. 7 using statistical process control (SPC) control limits at ±3 standard deviations. Anomalies were detected in seven of the nine parameters at 12:00, although in FIG. 7 only five parameters are presented to avoid overcrowding the figure.

In the example described above, the source IP address anomaly indicates a sudden increase in the diversity of the incoming traffic, as might be seen in a Distributed Denial of Service (DDoS) attack. Since the entropy model computes discrete probability distributions, it is possible to examine the probability (or improbability) of any given network packet or flow.

Note that in this example a simple application of entropy to different traffic metadata parameters is used. However, other more complex embodiments of entropy can be used, such as conditional entropy, Tsallis entropy, and/or hierarchical classification schemes. Additional parameters can also be considered, including temporal features, entropy of the payload data itself, etc.

Note that regardless of the choice of which parameter(s) to analyze and/or which specific entropy calculation is used, the mathematics and basic hardware implementation can be expected to be similar. Computing entropy requires a probability distribution or histogram of values, addition, multiplication, and logarithm operations, all of which can be implemented in a physically compact hardware form factor, such as a relatively small "dongle." This functionality can be implemented using any suitable technology or technologies. However, implementing hardware to perform entropy calculations and/or comparisons using an FPGA(s) and/or an ASIC(s) can facilitate smaller form factors, since such hardware generally requires less power, less space, and fewer components to implement the same functions. Memory requirements can be dependent upon the sizes of the histograms (e.g., in bins, and counts per bin), and the number of parameters for which entropy is to be tracked.

Note that metadata anomaly detection is merely an example of the functions that can be performed by process 400 at 404. In some embodiments, characterizing network traffic in terms of probability distributions can facilitate compact and expressive models of network device behaviors. For example, exchanging and comparing models among local monitoring devices and/or a central monitoring system can facilitate rapid dissemination of evolving benign behaviors and emerging threat activities. As another example, local monitoring devices, by virtue of placement near the periphery of a network, can perform deep packet inspection at many points in the network (e.g., as described below in connection with 412).

Additionally or alternatively, at 406, in some embodiments, process 400 can calculate one or more simple graph metrics. Examples of such metrics can include in-degree and out-degree. In some embodiments, process 400 can calculate one or more relatively complex graph metrics, such as Betweenness Centrality. Counting degree requires a table (or hash table or dictionary) tracking unique source and destination addresses. The size of the table depends upon the number of network nodes and traffic patterns. The same data structure can be used to compute complex graph metrics such as Betweenness Centrality. Note that such graph metrics can be implemented in software or using hardware logic (e.g., using an FPGA(s) and/or an ASIC(s)), which can facilitate calculation of such metrics using a relatively small form factor local monitoring device (e.g., rather than performing such calculations using a central monitoring system, or a costly specialized network probe).

At 406, the metrics calculated at 406 can be compared to expected values of the metrics based on a model of "normal" traffic. For example, process 400 can calculate a range of expected values for a particular metric (e.g., based on a distribution of metric values observed over a period of time), and process 400 can compare a metric value for a particular communication (e.g., an individual packet, a flow of packets), or during a particular time period (e.g., based on aggregated values over an interval of 1 minute, 2 minutes, 5 minutes, 10 minutes, etc.).

In some embodiments, the range can be calculated based on a standard deviation of the values of the metric over a particular time (e.g., over the last 12 hours, over the last day, over the last week, over a particular 12 hour span that was considered "normal," over a particular day that was considered "normal," etc.). For example, the range can be a range of one standard deviation on either side of the mean. As another example, the range can be a range of two standard deviations on either side of the mean. As yet another example, the range can be a range of three standard deviations on either side of the mean.

At 408, process 400 can determine if an anomaly has been detected based on one or more suitable criteria. For example, if a threshold number of parameters (e.g., a particular number, such as two, three, etc., or a particular fraction, such as one-third, half, two-thirds, etc.) produce values outside of a range considered normal, process 400 can determine that an anomaly has been detected. As another example, if a particular combination (or combinations) of values deviate from a range considered normal (e.g., destination address, and packet size), process 400 can determine that an anomaly has been detected.

If process 400 determines that an anomaly has not been detected ("NO" at 408), process 400 can return to 402 to receive additional network traffic. Otherwise, if process 400 determines that an anomaly has been detected ("YES" at 408), process 400 can move to 410.

At 410, process 400 can report to a central monitoring system that an anomaly has occurred. In some embodiments, the report can include any suitable information, such as a time when the anomaly was detected, the time period over which the anomalous traffic was received, identifying information of one or more metrics that were determined to be outside of a range considered normal (e.g., at 406), etc.

At 412, process 400 can analyze one or more packets received as part of the network traffic at 402. In some embodiments, any suitable technique or combination of techniques can be used to analyze packets. For example, process 400 can use one or more deep packet inspection (DPI) techniques to analyze packets. Examples of deep packet inspection techniques can include pattern matching with regular expressions (e.g., for an antivirus rule set, and for a Snort-based network intrusion detection rule set). As another example, process 400 can use a trained machine learning model to analyze packets. As yet another example, context-aware anomaly detection techniques can be used to attempt to identify zero-day attacks at the application layer (e.g., as described in Duessel et al., "Detecting Zero-day Attacks using context-aware anomaly detection at the Application-layer," International Journal of Information Security, pp. 1-16 (2016), which is hereby incorporated by reference herein in its entirety).

In general, DPI is a powerful tool for identifying threats in a network. However, DPI can require relatively high computational resources, and is thus often limited to only a few points on the network, such as firewalls or application appliances, which might evaluate all web traffic or incoming email.

While DPI is not usually widely deployed in the network, it is common to require malware protection (e.g., virus scanning) software on many networked systems (e.g., computing devices 104). In addition to scanning static files on those systems, the malware protection software often monitors specific application traffic, such as email. This computationally intensive task is typically only possible because it is distributed among many systems, essentially forming a parallel processing system.

In some embodiments, process 400 can be executed at many local monitoring devices (e.g., local monitoring devices 102), and can apply one or more DPI techniques to scan every packet traversing a limited portion of the network being monitored by that local monitoring device. For example, local monitoring devices that are deployed to monitor one, or a relatively small number of computing devices (e.g., as a "bump in the wire" device), can scan every byte of every packet that passes through it. Although the computational resources of each local monitoring device are limited when compared to large scale network probes, firewalls, servers, and many personal computers, such a local monitoring device can be programmed (e.g., through software, firmware, and/or hardware such as an FPGA or ASIC) to perform a limited scanning capability (e.g., by implementing only a small number of DPI techniques, by limiting the rule set to which packets are compared, etc.). This type of implementation can facilitate executing such scanning in parallel with anomaly detection and/or other functionality, and forms a parallel processing scanning engine that is configured to scan traffic payloads that may be invisible to conventional DPI installations, and can be used to protect systems that are incapable of running virus scanning software. In some embodiments, such as when a local monitoring device is connected directly to a particular computing device and on a networking infrastructure device upstream (e.g., one local monitoring device can be connected directly to a medical device, and another can be connected to a router upstream), the different local monitoring devices can be configured to perform different (e.g., non-overlapping) scanning to increase the protection afforded to the computing device. In some embodiments, local monitoring devices that have access to unencrypted communications can be configured to perform DPI, while local monitoring devices that have access only to encrypted communications can be configured to not perform DPI.

At 414, process 400 can determine whether a particular packet is malicious based on the results of the analysis performed at 412. For example, process 400 can determine that a particular packet is malicious based on the content of the packet having a signature that matches a signature that is associated with malicious activity (e.g., malware). As another example, process 400 can determine that a particular packet is malicious based on the content of the packet having a signature that does not match a signature that is associated with non-malicious activity (e.g., normal activity).

If process 400 does not determine that a packet is likely to be malicious ("NO" at 414), process 400 can return to 402. Otherwise, if process 400 determines that a packet is likely to be malicious ("YES" at 414), process 400 can move to 416.

At 416, process 400 can report to a central monitoring system that a malicious packet has been detected. In some embodiments, the report can include any suitable information, such as a time when the packet was received, results of a deep packet inspection (e.g., results of the analysis at 412), etc.

In some embodiments, 404 to 408 can be carried out in parallel with 412 to 416.

At 418, process 400 can provide network traffic and/or other information related to the anomaly and/or potentially malicious packet(s) to a central monitoring system. For example, in some embodiments, a device executing process 400 can cause all network traffic received at 402 over a particular period of time to be stored, and can provide such network traffic to the central monitoring system when an anomaly is detected. Additionally or alternatively, in some embodiments, a device executing process 400 can cause metadata related to all network traffic received at 402 over a particular period of time to be stored, and can provide such metadata to the central monitoring system when an anomaly is detected. Such metadata can include aggregated metadata used to generate entropy and/or one or more other metrics over the time period corresponding to the anomaly and/or previous time periods.

In some embodiments, a device executing process 400 can cause packets analyzed at 412 over a particular period of time to be stored, and can provide one or more packets to the central monitoring system when a packet is detected as likely to be malicious.

In some embodiments, because detection is performed in the network periphery, the report can be both compact and timely. In the case of anomaly detection, the monitor can report both the network data that raised the alarm, and also the anomaly model(s) (e.g., in the form of a histogram) that defines the background against which the anomaly is judged. By contrast, other reporting systems may require large amounts of data to be forwarded to a central analysis system prior to any analysis being carried out, which can cause significant delays as that data is stored and prepared for analysis.

At 420, process 400 can take an action to secure communications across a portion of the network being monitored. In some embodiments, process 400 can initiate such an action based on a result at 406 and/or 412. Additionally or alternatively, in some embodiments, process 400 can initiate such an action in response to an instruction from a central monitoring system (e.g., central monitoring system 130).

In some embodiments, a device executing process 400 can actively affect network traffic, with varying complexities and risks. For example, the device executing process 400 can actively block traffic (e.g., from a particular address, to a particular address, from a particular port, to a particular port, etc.) when instructed to do so by a central monitoring system. In a more particular example, if a distributed denial of service attack is detected, a central monitoring system can instruct one or more local monitoring devices executing process 400 to report (e.g., to provide traffic and/or other information at 418 regardless of whether an anomaly or malicious activity has been detected) and/or to block traffic matching a specific threat pattern. As another example, a process executing process 400 (e.g., a local monitoring device 102) can both report at 410, 416, and/or 418, and take action to block traffic that it considers extremely anomalous. In such an example, "retry" features of high level network protocols can be relied on for recovery from blocks of legitimate traffic.

Note that process 400 described above in connection with FIG. 4 is merely an example of a process that can be used to identify anomalous and/or potentially malicious traffic, and process 400 can other techniques, in addition to or in lieu of, anomaly detection using a model (e.g., as described in connection with 404-410) and/or malicious packet identification using deep packet inspection techniques (e.g., as described in connection with 404-410). For example, in some embodiments, process 400 can compare network traffic and/or metadata associated with network traffic to a list of explicitly allowed and/or explicitly disallowed addresses. In a more particular example, process 400 can determine that the network traffic is potentially malicious if process 400 determines that the address is on a list of explicitly disallowed addresses. As another more particular example, process 400 can determine that the network traffic is potentially malicious if process 400 determines that the address is not on a list of explicitly allowed addresses. As yet another more particular example, process 400 can determine that the network traffic is not malicious if process 400 determines that the address is not on a list of explicitly disallowed addresses.

As another example, process 400 can compare network traffic and/or metadata associated with network traffic to a temporal model that is based on temporal patterns in the network traffic. In a particular example, process 400 can determine that the network traffic is potentially malicious if the network traffic does not match the traffic represented by the temporal model. As another particular example, process 400 can determine that the network traffic is not malicious if the network traffic matches the traffic represented by the temporal model. As yet another more particular example, the temporal model can be a model of malicious activity, and process 400 can determine that the network traffic is malicious if the network traffic matches the traffic represented by the temporal model. As still another more particular example, the temporal model can be a model of malicious activity, and process 400 can determine that the network traffic is not malicious if the network traffic does not match the traffic represented by the temporal model.

As yet another example, process 400 can compare network traffic and/or metadata associated with a model based on scanning activity on the network. In a particular example, process 400 can determine that the network traffic is potentially malicious if the network traffic does not match the model based on scanning activity on the network. As another particular example, process 400 can determine that the network traffic is not malicious if the network traffic matches the model based on scanning activity on the network. As yet another more particular example, the model based on scanning activity on the network can be a model of malicious scanning activity, and process 400 can determine that the network traffic is malicious if the network traffic matches the model based on scanning activity on the network. As still another more particular example, the model based on scanning activity on the network can be a model of malicious activity, and process 400 can determine that the network traffic is not malicious if the network traffic does not match the model based on scanning activity on the network.

Figure 5:
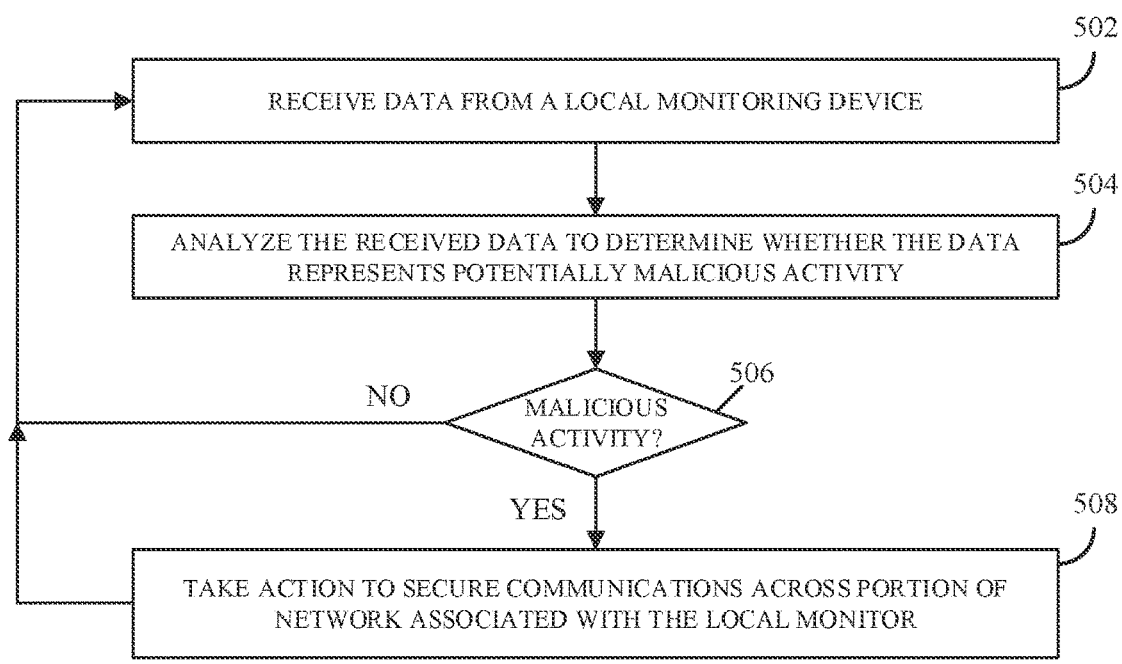
FIG. 5 shows an example of a process for detecting potentially malicious activity based on network data received from a local monitoring device in accordance with some embodiments of the disclosed subject matter.

FIG. 5 shows an example of a process for detecting potentially malicious activity based on network data received from a local monitoring device in accordance with some embodiments of the disclosed subject matter. At 502, process 500 can receive data from a local monitoring device. For example, process 500 can receive a report sent by a local monitoring device at 410 and/or 416, and network traffic and/or other information sent by a local monitoring device at 418.

At 504, process 500 can analyze the received data to determine whether the data represents potentially malicious activity. For example, in some embodiments, process 400 can determine that particular traffic is likely to be anomalous at 406, or likely to be malicious at 412, and can generate a report and send information that was used to make the determination(s). At 504, process 500 can attempt to verify whether the traffic that caused the alert is likely to be malicious. For example, process 500 can compare network activity to models from other local monitoring devices and/or to traffic patterns across a broader portion of the network to determine whether the traffic that the particular local monitoring device reported as anomalous traffic is anomalous compared to other network traffic. As another example, process 500 can execute (or cause to be executed) more sophisticated DPI techniques to a packet that was identified as potentially malicious by process 400.

If, at 506, process 500 determines that the activity is unlikely to have been malicious ("NO" at 506), process 500 can return to 502. Otherwise, if process 500 determines that the activity is likely to have been malicious ("YES" at 506), process 500 can proceed to 508.

At 508, process 500 can take appropriate action to secure communication across one or more portions of the network associated with the local monitoring device. For example, as described above in connection with 420, process 500 can instruct one or more local monitoring devices to block traffic fitting a particular threat pattern. As another example, process 500 can cause an alert to be presented to a user (e.g., a user responsible for security of the network, such as a network administrator) identifying a risk that was identified.

Figure 6:
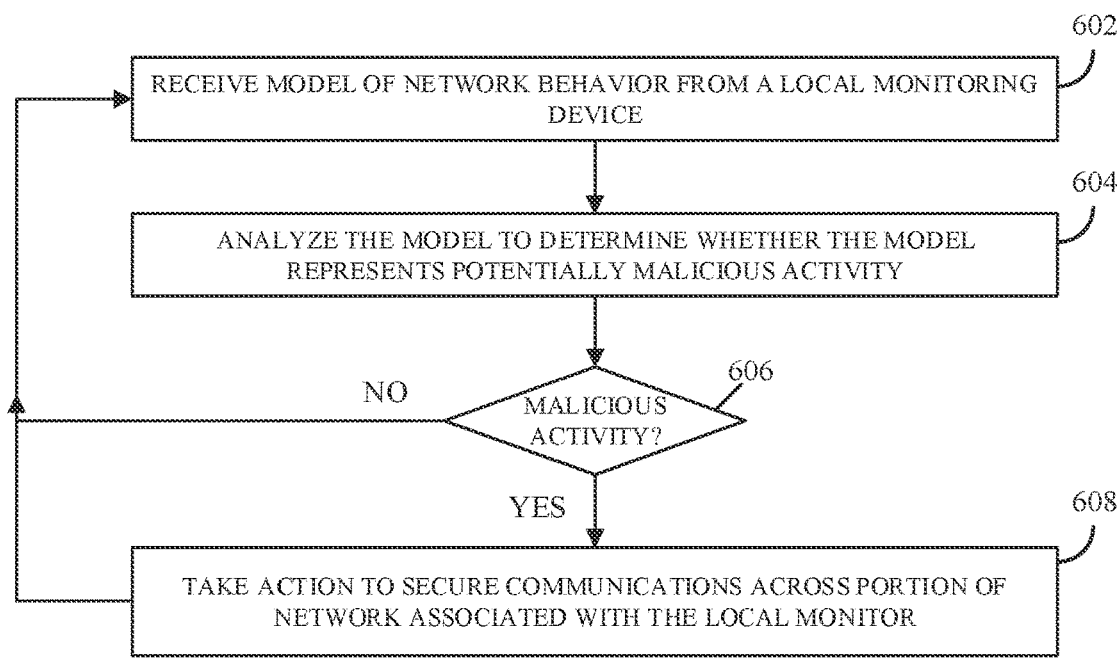
FIG. 6 shows an example of a process for detecting potentially malicious activity based on a model of network traffic received from a local monitoring device in accordance with some embodiments of the disclosed subject matter.

FIG. 6 shows an example of a process for detecting potentially malicious activity based on a model of network traffic received from a local monitoring device in accordance with some embodiments of the disclosed subject matter. At 602, process 600 can receive a model of network behavior from a local monitoring device. For example, such a model can be based on entropy calculations over time (e.g., as described above in connection with FIG. 4) and/or network traffic statistics over time.

At 604, process 600 can analyze the model received at 602 to determine whether the model represents potentially malicious activity. For example, process 600 can compare the model received at 602 to one or more models received from other local monitoring devices and/or a model generated by a device executing process 600 (e.g., central monitoring device 130) based on aggregated network traffic over multiple local monitoring devices. In some embodiments, the model(s) used for comparison at 604 can be selected from models representing traffic to a similar device(s).

At 606, process 600 can determine whether the model represents potentially malicious activity based on the comparison at 604. For example, if one or more features of the model diverges significantly from the model to which it is being compared, process 600 can determine that the "normal" model received at 602 may represent ongoing malicious activity.

If process 600 determines that the model likely does not represent malicious activity ("NO" at 606), process 600 can return to 602. Otherwise, if process 600 determines that the model likely represents malicious activity ("YES" at 606), process 600 can move to 608.

At 608, process 600 can take appropriate action to secure communication across one or more portions of the network associated with the local monitoring device. For example, as described above in connection with 420, process 600 can instruct one or more local monitoring devices to block traffic fitting a particular threat pattern. As another example, process 600 can cause an alert to be presented to a user (e.g., a user responsible for security of the network, such as a network administrator) identifying a risk that was identified.

Figure 7:
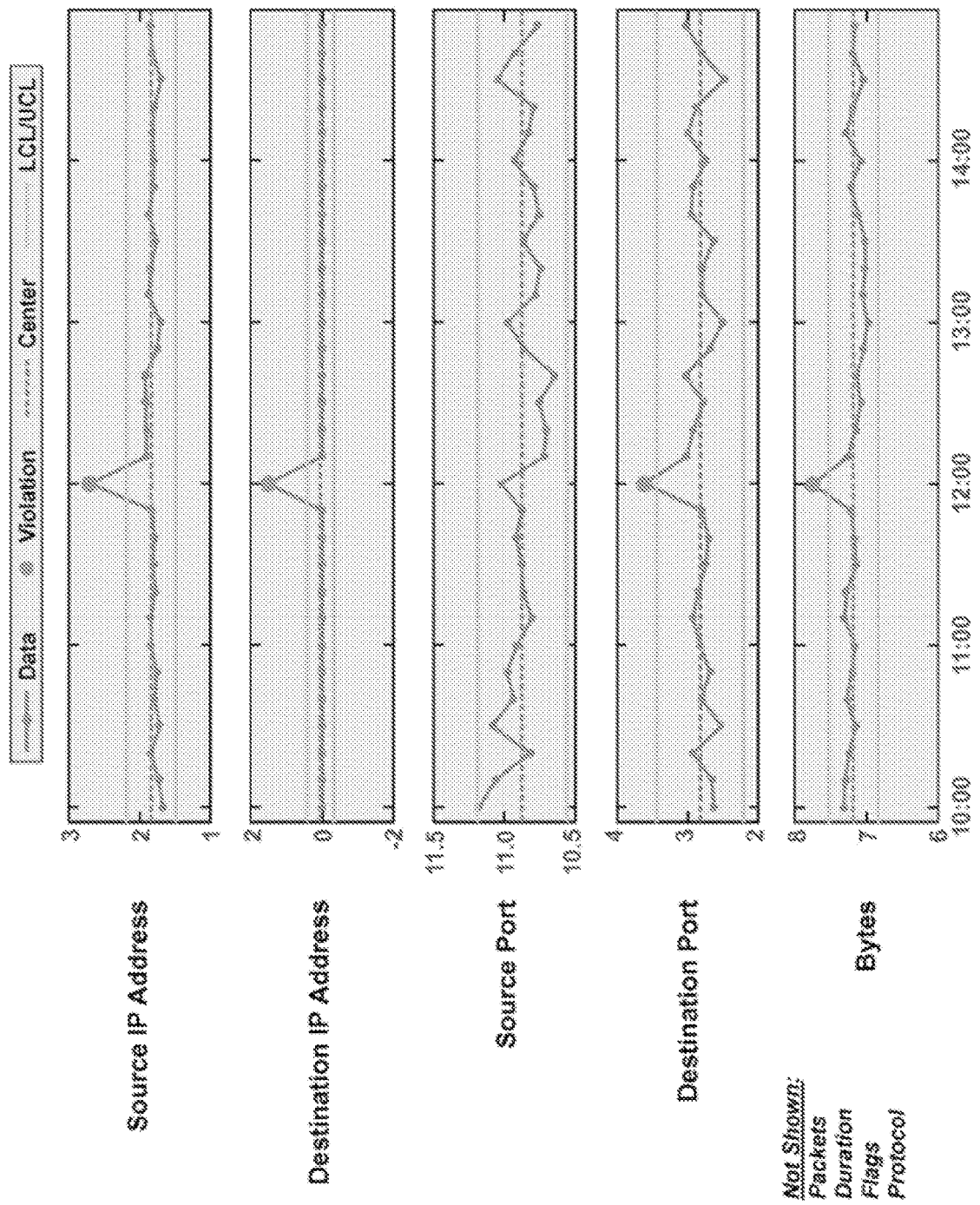
FIG. 7 shows an example of entropy over time that can be used in anomaly detection by a local monitoring device in accordance with some embodiments of the disclosed subject matter.

FIG. 7 shows an example of entropy over time that can be used by in anomaly detection by a local monitoring device in accordance with some embodiments of the disclosed subject matter. As shown in FIG. 7, incoming network traffic was analyzed for a single web server on the Mayo network. An anomaly was intentionally introduced at 12:00 by copying traffic records from another server into the data. Normal behavior and the anomaly are plotted in FIG. 7 using statistical process control (SPC) control limits at ±3 standard deviations. As partially shown in FIG. 7, anomalies were detected in seven of the nine parameters at 12:00.

Figure 8A:
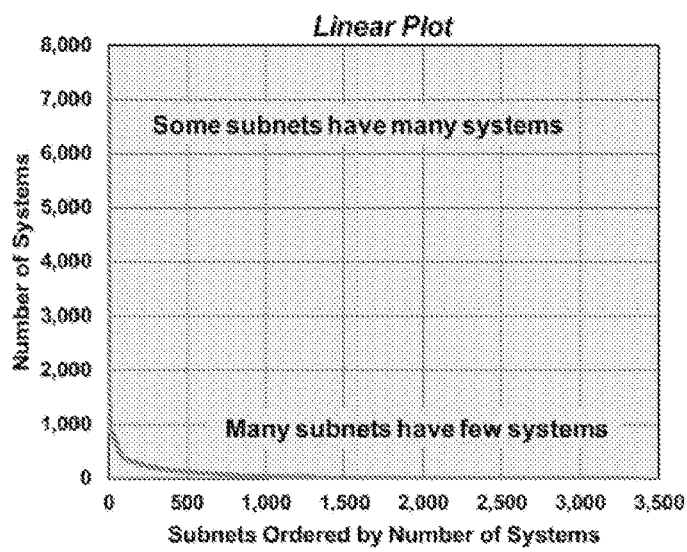
FIG. 8A shows a plot of the number of subnets in each of various systems in an organizational intranet with linear axes.
Figure 8B:
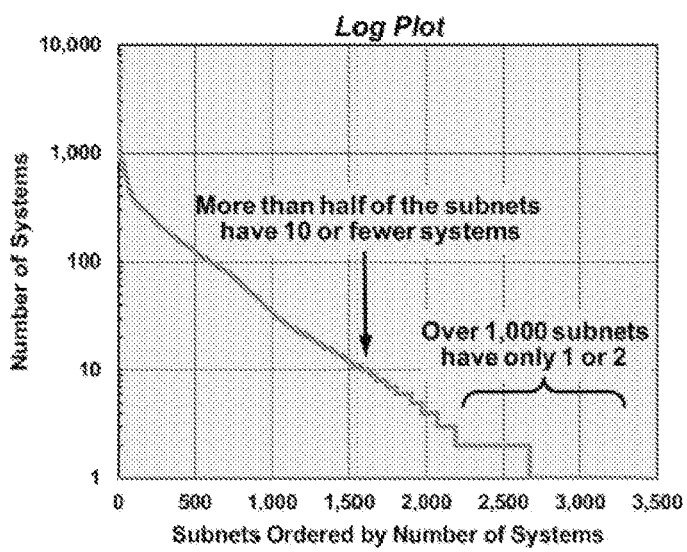
FIG. 8B shows a plot of the number of subnets in each of various systems in an organizational intranet with a log y-axis.
Figure 8C:
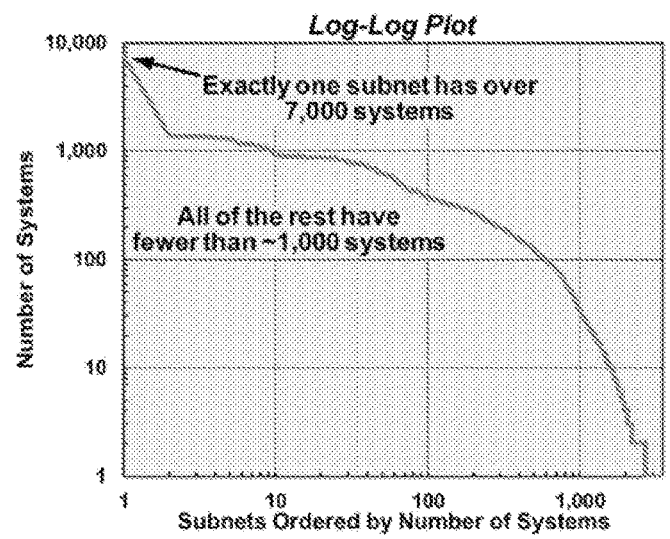
FIG. 8C shows a plot of the number of subnets in each of various systems in an organizational intranet with a log x-axis and a log y-axis.

FIGS. 8A to 8C show plots of the number of subnets in each of various systems in an organizational intranet with linear axes, a log y-axis, and log axes, respectively. To quantify the amount of data that a local monitoring device implemented in accordance with some embodiments of the disclosed subject matter may need to process, metadata captured from the Mayo intranet was evaluated. The metadata was captured from one hour of network activity on a typical business day, and included over 210,000 internal addresses communicating with an additional 170,000 external systems. The average network load was 17 million packets per second, carrying 12 GB of data per second. The routers reported slightly over 210,000 flows (metadata records) per second. The dominant network protocols were TCP (70%) and UDP (23%), with over 140 million distinct combinations of source and destination address and port.

The Mayo network is logically divided into 3,384 subnetworks, which provides a map to the network routing infrastructure. Both the logical structure of the network, and the amount and qualities of traffic on the various subnetworks were analyzed, to provide an example of the volume of data that can be expected in a relatively large and complex network environment.

Note that a local monitoring device connected to a single networked system can be expected to process data only for the attached system, and not for an entire sub-network. Accordingly, anomalies can only be detected with respect to normal behavior for the networked system to which the local monitoring device is connected. In such an example, simple network graph metrics (e.g., out-degree) can be calculated by simply counting the unique addresses in the traffic, while more complex graph analytics are often impossible at the single-system level.

The number of systems on any given subnet can affect the amount of work that a local monitoring device must do if it is implemented to monitor the entire subnet. The distribution is non-uniform, with a small number of subnets supporting a thousand systems, while the vast majority of systems support only dozens of systems. The number of systems on a subnet can impact the memory requirements of local monitoring devices attached to the network infrastructure.

The distribution count, of systems per subnet, is shown in FIGS. 8A to 8C using three different sets of axes to illustrate a "long tail" distribution that is common both in computer networks and graph analytics. From the linear plot in FIG. 8A, it can be observed that there are a few networks with a high system count. Plotting the same data with a log Y axis in FIG. 8B clarifies that more than half of the subnets have 10 or fewer systems, while the log-log plot in FIG. 8C makes it clear that there are only about ten subnets with more than 1,000 systems.

Figure 9:
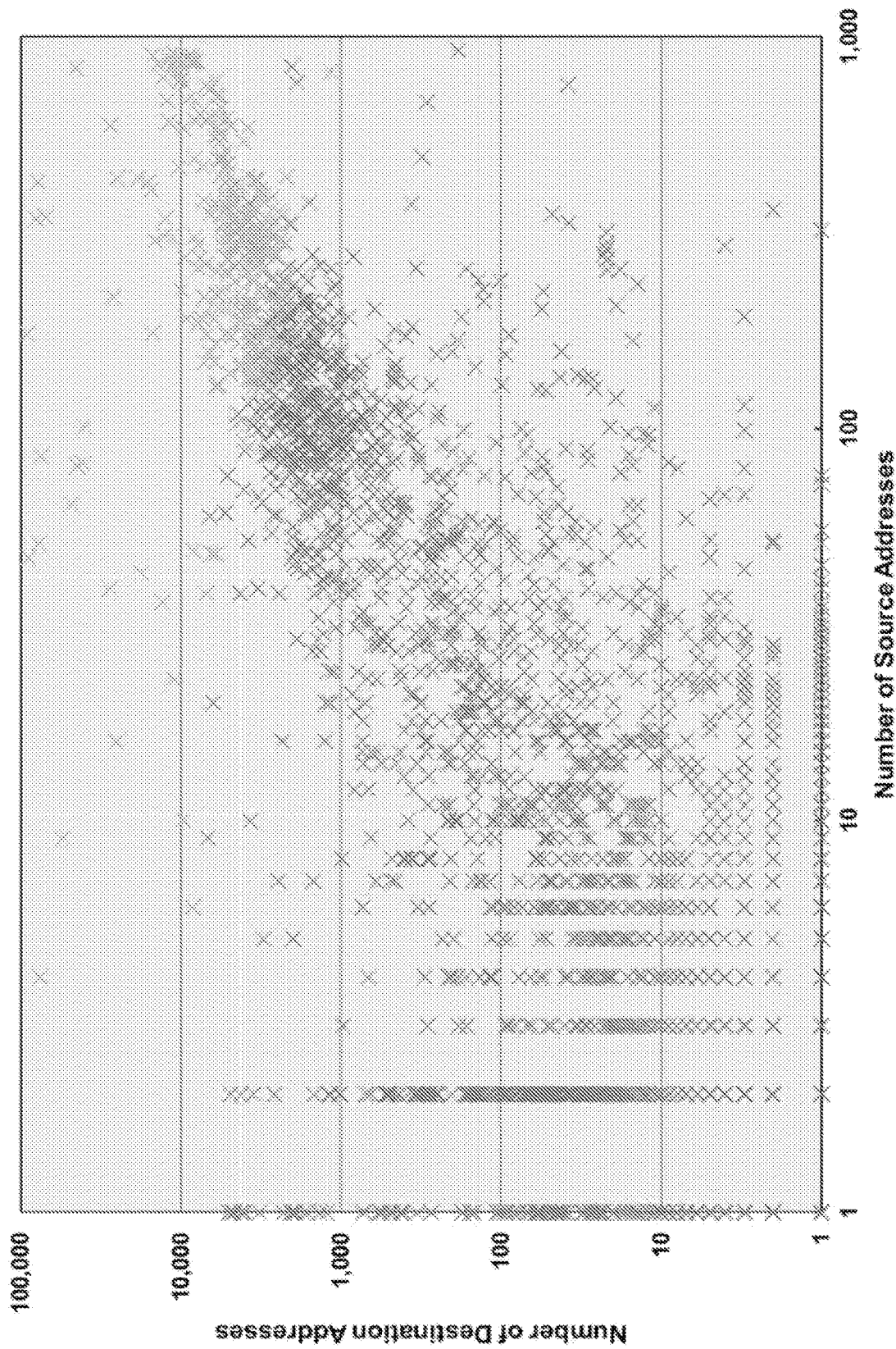
FIG. 9 shows a scatter plot of source and destination address counts for the number of subnets of various systems in an organizational intranet with log axes.

FIG. 9 shows a scatter plot of source and destination address counts for the number of subnets of various systems in an organizational intranet with log axes. To illustrate the diversity of source and destination address counts across all subnets in the Mayo network, FIG. 9 shows a scatter diagram in which each "x" represents one subnet. The location of an "x" along the x-axis in FIG. 9 represents the number of systems on the subnet, and the location along the y-axis in FIG. 9 represents the number of distinct destination addresses for those systems. The subnets that fall on the vertical y-axis, with exactly one system per subnet, are likely server systems. These systems exchange traffic with one or more other systems—up to thousands of systems. The "x"s in FIG. 9 are divided such that the 90% of the subnets with the smallest number of distinct source and address combinations are presented in a darker shade. These subnets have fewer than 7,000 source and destination combinations. Accordingly, a local monitoring device that was implemented to evaluate metrics on a source/destination basis across such a subnet, and that had at least 7,000 copies of counters used to track such metrics, could be used to monitor approximately 90% of Mayo subnets.

Figure 10:
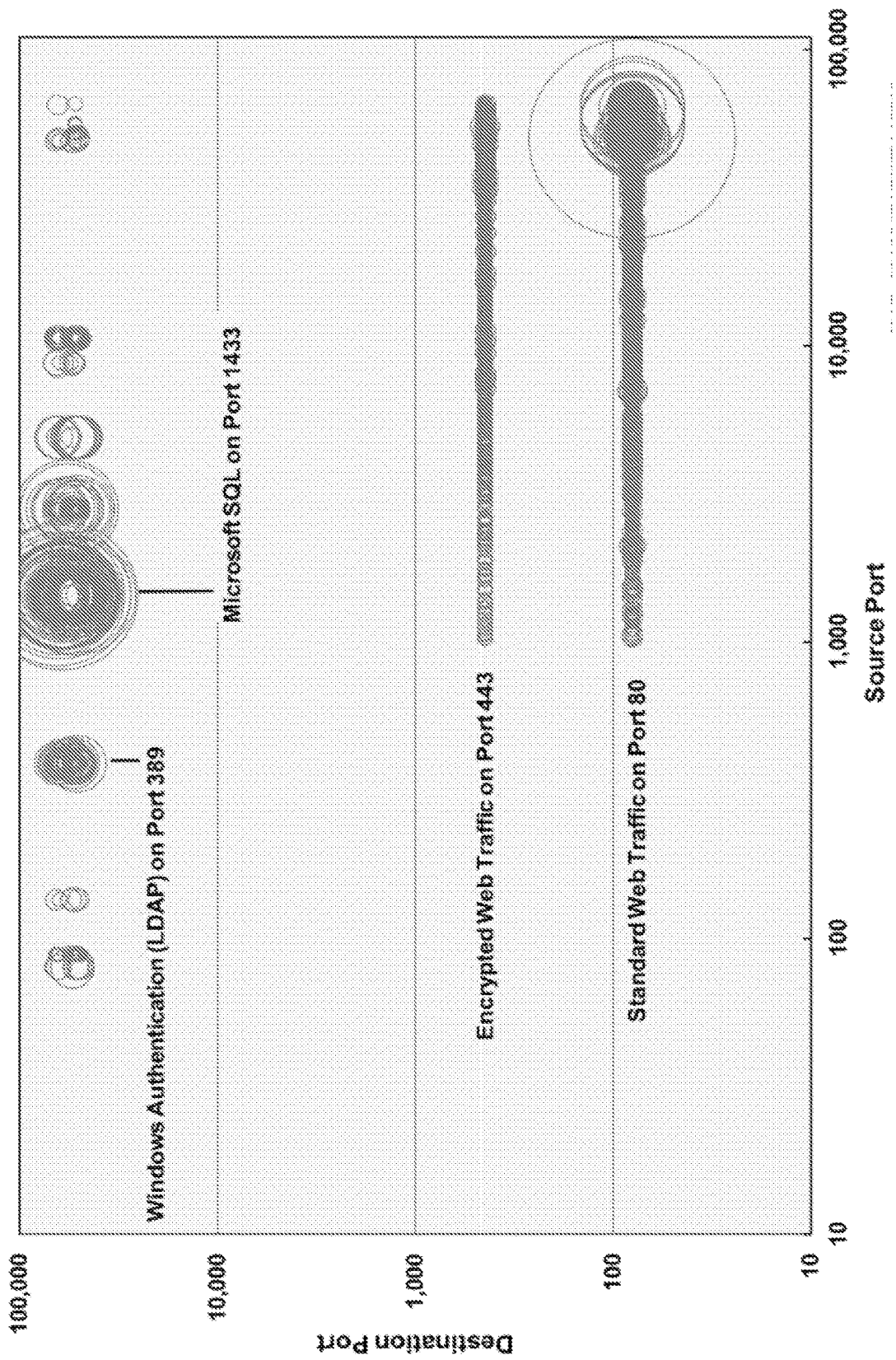
FIG. 10 shows a scatter plot of source and destination address combinations for a web server in an organizational intranet with log axes.
Figure 11:
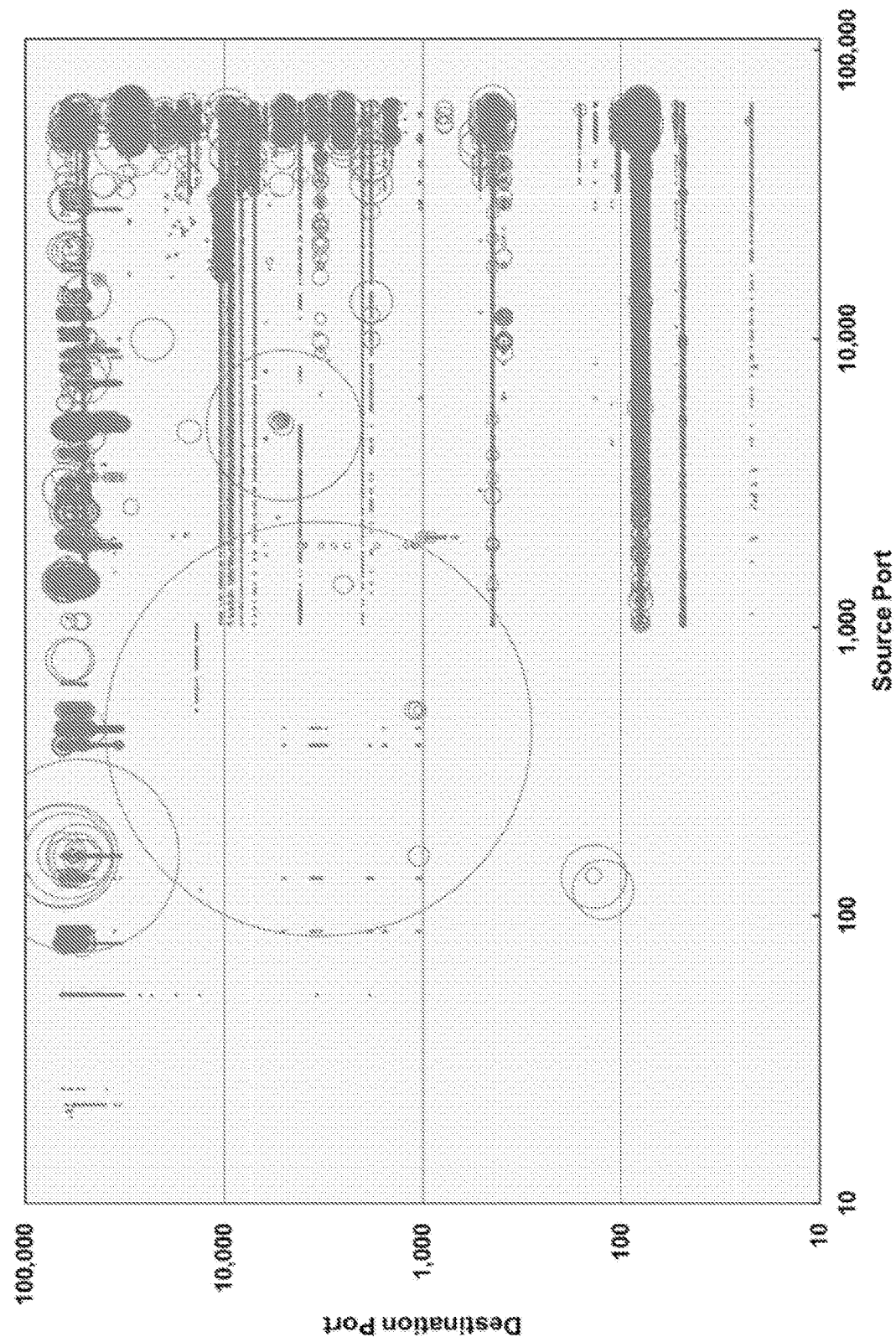
FIG. 11 shows a scatter plot of source and destination address combinations for a group of systems in an organizational intranet with log axes.

FIGS. 10 and 11 show scatter plots of source and destination address combinations for a web server in an organizational intranet with log axes, and for a group of systems in the organizational intranet with log axes, respectively.

In addition to source and destination address, most network packets include source and destination port numbers. Port numbers can be thought of as somewhat analogous to apartment numbers or suite numbers for building addresses. The street address (analogous to the destination address in this example) can ensure delivery to the correct building (e.g., computer system), and the apartment number (analogous to the port number) can specify an apartment to which the message is directed (e.g., an application for which the message is intended). Many of the 65,535 unique port numbers are registered with the Internet Assigned Numbers Authority (IANA) for specific purposes. Examples include port 25 for email and port 80 for web traffic. High numbered ports are generally used by applications on as-needed basis, keeping different traffic streams separate. For example, a web browser with multiple windows might use distinct ports to keep each window's data separated.

Port diversity can impact requirements for a local monitoring device. For one web server's traffic, source and destination ports are illustrated in FIG. 10. Each bubble in FIG. 10 represents a unique combination of source port and address port, and the size of the bubble indicates the amount of traffic with that port combination. Several distinct traffic patterns emerge, related to specific applications and protocols supported by the web server. For example, incoming web requests generally arrive on port 80, which is annotated on the chart. The source port for that traffic, chosen by the client web browser, ranges from approximately 1,000 to 65,000. Additionally, encrypted web traffic (HTTPS) generally arrives on port 443, transactions with the Windows authentication server on port 389, and correspondence with a SQL server on port 1433. Although there are a large number of source and destination ports, there are only about 20 behaviors to be analyzed for this particular server.

If this combination of source and destination ports are considered as a behavioral pattern that can be described and measured, the rest of the network can be queried to determine the prevalence of the pattern. For example, querying for port 80 web servers, 6,691 systems were found exhibiting that behavior. When the four patterns of web server (with and without encryption), SQL client and Windows authentication client are used, exactly 57 systems behaving as web application servers were identified.

Note that a local monitoring device connected to a single system can utilize high level patterns such as these to evaluate behavior. A central monitoring system can collect pattern components from many systems on the network, and can apply cluster analysis or other techniques to derive common high order behavior models using observations from individual local monitoring devices. Even if the behavioral patterns are not identified semantically (e.g., pattern A corresponds to a web server, pattern B corresponds to a mail server), the patterns can be derived from the network and used when evaluating behavior of a particular example(s) of a device.

The same source/destination port plot was generated for the subnet on which the web server of FIG. 10 resides, and is shown in FIG. 11. The port distributions shown in FIG. 11 indicate that there are perhaps a few hundred port combination patterns for the 423 systems on the subnet for which the plot was generated. Accordingly, while the combinatorial measurements of the entire intranet are very large, carefully crafted traffic models for the local monitoring devices can support relatively large subnets with hundreds or perhaps a few thousands of independent models.

FURTHER EXAMPLES HAVING A VARIETY OF FEATURES

Implementation examples are described in the following numbered clauses:

1. A system for distributed network monitoring, comprising: a plurality of local monitoring devices, each of the plurality of local monitoring devices disposed between at least one computing device and a networking router, each particular local monitoring device of the plurality of devices comprising: at least one processor that is programmed to: receive, over a first period of time, network traffic between the at least one computing device and the networking router associated with the particular local monitoring device; generate a model of normal network traffic over the first period of time based on the network traffic between the at least one computing device and the networking router associated with the particular local monitoring device; receive, over a second period of time subsequent to the first period of time, network traffic between the at least one computing device and the networking router associated with the particular local monitoring device; calculate a metric based on a parameter of metadata associated with the network traffic received over the second period of time; determine, based on the metric, whether the network traffic received over the second period of time is anomalous; and in response to determining that the network traffic received over the second period of time is anomalous, transmit, to a central monitoring system, information indicating that the network traffic received over the second period of time is anomalous; and the central monitoring system comprising: at least one second processor that is programmed to: receive, from a first local monitoring device of the plurality of local monitoring devices, information indicating that the network traffic received over the second period of time is anomalous; receive, from the first local monitoring device, information related to the network traffic received by the first local monitoring device over the second period of time; determine, based on the information related to the network traffic received by the first local monitoring device over the second period of time, that the network traffic received by the first local monitoring device over the second period of time is anomalous; and in response to determining that the network traffic received by the first local monitoring device over the second period of time is anomalous, take an action to secure communications across a portion of the network associated with the first local monitoring device.

2. The system of claim 1, wherein the at least one processor is further programmed to determine whether the network traffic received over the second period of time is anomalous based on the model of normal network traffic.

3. The system of any one of claim 1 or 2, wherein the information related to the network traffic comprises the model of normal network traffic generated by the first local monitoring device.

4. The system of any one of claims 1 to 3, wherein the metric comprises entropy of the parameter of metadata associated with the network traffic received over the second period of time.

5. The system of any one of claims 1 to 4, wherein the parameter of metadata associated with the network traffic received over the second period of time comprises source IP address.

6. The system of any one of claims 1 to 5, wherein the model of normal network traffic over the first period of time comprises a range based on an average entropy value of the parameter of metadata associated with the network traffic received over the second period of time.

7. The system of any one of claims 1 to 6, wherein the action to secure communications across a portion of the network associated with the first local monitoring device comprises causing a user to be presented with an alert indicating that the network traffic network traffic received by the first local monitoring device over the second period of time was anomalous.

8. The system of any one of claims 1 to 7, wherein the action to secure communications across a portion of the network associated with the first local monitoring device comprises causing the first local monitoring device to block traffic from a source IP address that caused the network traffic received by the first local monitoring device over the second period of time to be anomalous.

9. The system of any one of claims 1 to 8, wherein the at least one processor comprises a field programmable gate array (FPGA), and wherein the at least one processor is programmed at least in part based on a configuration of logic gates in the FPGA.

10. The system of any one of claims 1 to 9, wherein the at least one processor comprises an application specific integrated circuit (ASIC), and wherein the at least one processor is programmed at least in part based on a configuration of logic gates in the ASIC.

11. An apparatus for distributed network monitoring, comprising: at least one processor that is programmed to: receive, over a first period of time, network traffic between at least one computing device and a networking router; generate a model of normal network traffic over the first period of time; receive, over a second period of time subsequent to the first period of time, network traffic between the at least one computing device and the networking router; calculate a metric based on a parameter of metadata associated with the network traffic received over the second period of time; determine, based on the metric and using the model of normal network traffic, that the network traffic received over the second period of time is anomalous; and in response to determining that the network traffic received over the second period of time is anomalous, transmit, to a central monitoring system, information indicating that the network traffic received over the second period of time is anomalous.

12. The apparatus of claim 11, wherein the at least one processor is further programmed to transmit the model of normal network traffic over the first period of time to the central monitoring system.

13. The apparatus of any one of claim 11 or 12, further comprising: a first Ethernet port; and a second Ethernet port, wherein the at least one processor that is further programmed to receive at least a portion of the network traffic received over the first period of time using the first Ethernet port.

14. The apparatus of claim 13, wherein the at least one processor is further programmed to transmit at least the portion of the network traffic received over the first period of time to the one or more computing devices using the second Ethernet port.

15. The apparatus of any one of claim 13 or 14, wherein the at least one processor is further programmed to: receive at least a second portion of the network traffic received over the first period of time using the second Ethernet port; and transmit at least the second portion of the network traffic received over the first period of time to the networking router using the first Ethernet port.

16. The apparatus of any one of claims 11 to 15, wherein the metric comprises entropy of the parameter of metadata associated with the network traffic received over the second period of time.

17. The apparatus of any one of claims 11 to 16, wherein the parameter of metadata associated with the network traffic received over the second period of time comprises a destination port.

18. The apparatus of any one of claims 11 to 17, wherein the model of normal network traffic over the first period of time comprises a range based on an average entropy value of the parameter of metadata associated with the network traffic received over the second period of time.

19. The apparatus of any one of claims 11 to 18, wherein the at least one processor is further programmed to: receive, from the central monitoring system, an instruction to block traffic from a source IP address that caused the network traffic received by the apparatus over the second period of time to be anomalous.

20. The apparatus of any one of claims 11 to 19, wherein the at least one processor comprises a field programmable gate array (FPGA), and wherein the at least one processor is programmed at least in part based on a configuration of logic gates in the FPGA.

21. A method for distributed network monitoring, comprising: receiving, over a first period of time, network traffic between at least one computing device and a networking router; generating a model of normal network traffic over the first period of time; receiving, over a second period of time subsequent to the first period of time, network traffic between the at least one computing device and the networking router; calculating a metric based on a parameter of metadata associated with the network traffic received over the second period of time; determining, based on the metric, that the network traffic received over the second period of time is anomalous; and in response to determining that the network traffic received over the second period of time is anomalous, transmitting, to a central monitoring system, information indicating that the network traffic received over the second period of time is anomalous.

22. The method of claim 21, further comprising transmitting the model of normal network traffic over the first period of time to the central monitoring system.

23. The method of any one of claim 21 or 22, further comprising: receiving information indicating that the network traffic received over the second period of time is anomalous; receiving information related to the network traffic received over the second period of time; confirming, based on the information related to the network traffic received over the second period of time, that the network traffic received over the second period of time is anomalous; and in response to confirming that the network traffic received over the second period of time is anomalous, take an action to secure communications across a portion of the network associated with network traffic received over the second period of time.

24. The method of claim 23, wherein confirming that the network traffic received over the second period of time is anomalous comprises: identifying a cluster of local monitoring devices that includes a local monitoring device that received the network traffic over the second period of time; comparing the information related to the network traffic received over the second period of time to a second model of normal network traffic associated with a different local monitoring device in the cluster; and confirming that the network traffic received over the second period of time is anomalous based on the metric being anomalous compared to the second model of normal network traffic.

25. The method of claim 23, wherein confirming that the network traffic received over the second period of time is anomalous comprises: identifying a cluster of local monitoring devices that includes a local monitoring device that received the network traffic over the second period of time; comparing the information related to the network traffic received over the second period of time to a third model of normal network traffic associated with the cluster of local monitoring devices, wherein the third model was generated based on models of normal network traffic associated with a plurality of local monitoring devices in the cluster; and confirming that the network traffic received over the second period of time is anomalous based on the metric being anomalous compared to the third model of normal network traffic.

26. A system comprising: at least one hardware processor that is configured to: perform a method of any one of clauses 21 to 25.

27. A non-transitory computer readable medium containing computer executable instructions that, when executed by a processor, cause the processor to perform a method of any one of clauses 21 to 25.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any other suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 4 to 6 can be executed or performed in any order or sequence not limited to the order and sequence shown and described in the figures. Also, some of the above steps of the processes of FIGS. 4 to 6 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for distributed network monitoring, comprising:
   a plurality of local monitoring devices, each of the plurality of local monitoring devices disposed between at least one computing device and a networking router, each particular local monitoring device of the plurality of devices comprising:
      at least one processor that is programmed to:
         receive, over a first period of time, network traffic between the at least one computing device and the networking router associated with the particular local monitoring device;
         generate a model of normal network traffic over the first period of time based on the network traffic between the at least one computing device and the networking router associated with the particular local monitoring device;
         receive, over a second period of time subsequent to the first period of time, network traffic between the at least one computing device and the networking router associated with the particular local monitoring device;
         calculate a metric based on a parameter of metadata associated with the network traffic received over the second period of time;
         determine, based on the metric, whether the network traffic received over the second period of time is anomalous; and
         in response to determining that the network traffic received over the second period of time is anomalous, transmit, to a central monitoring system, information indicating that the network traffic received over the second period of time is anomalous; and
   the central monitoring system comprising:
      at least one second processor that is programmed to:
         receive, from a first local monitoring device of the plurality of local monitoring devices, information indicating that the network traffic received over the second period of time is anomalous;
         receive, from the first local monitoring device, information related to the network traffic received by the first local monitoring device over the second period of time;
         determine, based on the information related to the network traffic received by the first local monitoring device over the second period of time, that the network traffic received by the first local monitoring device over the second period of time is anomalous; and
         in response to determining that the network traffic received by the first local monitoring device over the second period of time is anomalous, take an action to secure communications across a portion of the network associated with the first local monitoring device.

2. The system of claim 1, wherein the at least one processor is further programmed to determine whether the network traffic received over the second period of time is anomalous based on the model of normal network traffic.

3. The system of claim 1, wherein the information related to the network traffic comprises the model of normal network traffic generated by the first local monitoring device.

4. The system of claim 1, wherein the metric comprises entropy of the parameter of metadata associated with the network traffic received over the second period of time.

5. The system of claim 1, wherein the model of normal network traffic over the first period of time comprises a range based on an average entropy value of the parameter of metadata associated with the network traffic received over the second period of time.

6. The system of claim 1, wherein the at least one processor comprises a field programmable gate array (FPGA), and wherein the at least one processor is programmed at least in part based on a configuration of logic gates in the FPGA.

7. An apparatus for distributed network monitoring, comprising:
   at least one processor that is programmed to:
      receive, over a first period of time, network traffic between at least one computing device and a networking router;
      generate a model of normal network traffic over the first period of time;
      receive, over a second period of time subsequent to the first period of time, network traffic between the at least one computing device and the networking router;
      calculate a metric based on a parameter of metadata associated with the network traffic received over the second period of time;
      determine, based on the metric and using the model of normal network traffic, that the network traffic received over the second period of time is anomalous; and
      in response to determining that the network traffic received over the second period of time is anomalous, transmit, to a central monitoring system, information indicating that the network traffic received over the second period of time is anomalous.

8. The apparatus of claim 7, wherein the at least one processor is further programmed to transmit the model of normal network traffic over the first period of time to the central monitoring system.

9. The apparatus of claim 7, further comprising:
   a first Ethernet port; and
   a second Ethernet port,
   wherein the at least one processor that is further programmed to receive at least a portion of the network traffic received over the first period of time using the first Ethernet port.

10. The apparatus of claim 9, wherein the at least one processor is further programmed to transmit at least the portion of the network traffic received over the first period of time to the one or more computing devices using the second Ethernet port.

11. The apparatus of claim 9, wherein the at least one processor is further programmed to:
  receive at least a second portion of the network traffic received over the first period of time using the second Ethernet port; and
  transmit at least the second portion of the network traffic received over the first period of time to the networking router using the first Ethernet port.

12. The apparatus of claim 7, wherein the metric comprises entropy of the parameter of metadata associated with the network traffic received over the second period of time.

13. The apparatus of claim 7, wherein the parameter of metadata associated with the network traffic received over the second period of time comprises a destination port.

14. The apparatus of claim 7, wherein the model of normal network traffic over the first period of time comprises a range based on an average entropy value of the parameter of metadata associated with the network traffic received over the second period of time.

15. The apparatus of claim 7, wherein the at least one processor is further programmed to:
  receive, from the central monitoring system, an instruction to block traffic from a source IP address that caused the network traffic received by the apparatus over the second period of time to be anomalous.

16. A method for distributed network monitoring, comprising:
  receiving, over a first period of time, network traffic between at least one computing device and a networking router;
  generating a model of normal network traffic over the first period of time;
  receiving, over a second period of time subsequent to the first period of time, network traffic between the at least one computing device and the networking router;
  calculating a metric based on a parameter of metadata associated with the network traffic received over the second period of time;
  determining, based on the metric, that the network traffic received over the second period of time is anomalous; and
  in response to determining that the network traffic received over the second period of time is anomalous, transmitting, to a central monitoring system, information indicating that the network traffic received over the second period of time is anomalous.

17. The method of claim 16, further comprising transmitting the model of normal network traffic over the first period of time to the central monitoring system.

18. The method of claim 16, comprising:
  receiving information indicating that the network traffic received over the second period of time is anomalous;
  receiving information related to the network traffic received over the second period of time;
  confirming, based on the information related to the network traffic received over the second period of time, that the network traffic received over the second period of time is anomalous; and
  in response to confirming that the network traffic received over the second period of time is anomalous, take an action to secure communications across a portion of the network associated with network traffic received over the second period of time.

19. The method of claim 18, wherein confirming that the network traffic received over the second period of time is anomalous comprises:
  identifying a cluster of local monitoring devices that includes a local monitoring device that received the network traffic over the second period of time;
  comparing the information related to the network traffic received over the second period of time to a second model of normal network traffic associated with a different local monitoring device in the cluster; and
  confirming that the network traffic received over the second period of time is anomalous based on the metric being anomalous compared to the second model of normal network traffic.

20. The method of claim 18, wherein confirming that the network traffic received over the second period of time is anomalous comprises:
  identifying a cluster of local monitoring devices that includes a local monitoring device that received the network traffic over the second period of time;
  comparing the information related to the network traffic received over the second period of time to a third model of normal network traffic associated with the cluster of local monitoring devices, wherein the third model was generated based on models of normal network traffic associated with a plurality of local monitoring devices in the cluster; and
  confirming that the network traffic received over the second period of time is anomalous based on the metric being anomalous compared to the third model of normal network traffic.

* * * * *